United States Patent
Kano

(10) Patent No.: US 8,160,099 B2
(45) Date of Patent: *Apr. 17, 2012

(54) RADIO COMMUNICATION TERMINAL, RADIO BASE STATION, AND PACKET COMMUNICATION METHOD

(75) Inventor: Jun Kano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 601 days.

This patent is subject to a terminal disclaimer.

(21) Appl. No.: 12/361,134

(22) Filed: Jan. 28, 2009

(65) Prior Publication Data

US 2009/0245173 A1    Oct. 1, 2009

Related U.S. Application Data

(60) Provisional application No. 61/024,155, filed on Jan. 28, 2008.

(51) Int. Cl.
*H04W 24/02* (2009.01)
(52) U.S. Cl. ....................................................... 370/468
(58) Field of Classification Search .................. 370/468, 370/470, 471
See application file for complete search history.

(56) References Cited

U.S. PATENT DOCUMENTS

| | | | | |
|---|---|---|---|---|
| 7,328,283 B2 * | 2/2008 | Tan et al. | ....................... | 709/247 |
| 2006/0246900 A1 * | 11/2006 | Zheng | ........................ | 455/435.3 |
| 2006/0256719 A1 * | 11/2006 | Hsu et al. | ....................... | 370/230 |
| 2007/0058545 A1 * | 3/2007 | Nookala et al. | ............... | 370/230 |
| 2008/0310428 A1 * | 12/2008 | Lei et al. | ....................... | 370/400 |

FOREIGN PATENT DOCUMENTS

JP     2007300236 A     11/2007

OTHER PUBLICATIONS

Wang, J. et al., The cdma2000 QoS, as developed in TSG-X, Last accessed Jul. 17, 2006 at ftp.3gpp2.org/TSGA/Working/2004/0920-Clearwater/TSG-A+C+X%20QoS/X00-20040920-24-QoS%20presentation.pdf. 24pp.*
"cdma2000 Wireless IP Network Standard: Quality of Service and Header Reduction" 3GPP2, Version 1.0, Feb. 2000.

* cited by examiner

*Primary Examiner* — Melvin Marcelo
(74) *Attorney, Agent, or Firm* — DLA Piper LLP (US)

(57) ABSTRACT

A radio communication terminal according to the present invention transmits and receives multiple types of packets including a RTP packet to and from a communication destination device. The radio communication terminal sets an auxiliary service instance used for transmitting the RTP packet and a main service instance used for transmitting another type of packet between the radio communication terminal and the communication destination device. Depending on radio quality information, the radio communication terminal selects any one of a mode in which a service instance flow ID to identify a service instance is added to the RTP packet and a mode in which the addition of the service instance flow ID is omitted.

8 Claims, 19 Drawing Sheets

FIG. 9

SIZE OF PAYLOAD AND OVERHEAD IN MAIN SERVICE INSTANCE

| ELEMENT | SIZE (OCTET) | |
|---|---|---|
| PPP PACKET PAYLOAD | X | TCP/IP OR THE LIKE |
| PPP HEADER | 10 | · WHEN MAIN SERVICE OPTION (SO59) IS USED<br>· WHEN FCS WITH 4 OCTETS IS USED |
| SERVICE INSTANCE FLOW ID | 1 | ALWAYS "1" |
| L3 DELIMITER | 2 | 17≦L3 PACKET SIZE ≦144 |
| TOTAL | X+13 | |

FIG. 10

SIZE OF PAYLOAD AND OVERHEAD IN AUXILIARY SERVICE INSTANCE (WHEN SHARED CHANNEL MODE IS USED)

| ELEMENT | SIZE (OCTET) | |
|---|---|---|
| CODEC PAYLOAD | X | IN THE CASE OF G729A (8Kbps) 2 CODEC PAYLOADS, X=20 |
| ROHC PROTOCOL HEADER | Y | IN THE CASE OF SMALL CID AND UDP CHECK SUM, Y=3 |
| PPP HEADER | 0 | OMITTED DUE TO USAGE OF SERVICE OPTION (SO67) |
| SERVICE INSTANCE FLOW ID | 1 | VALUE EQUAL TO OR LARGER THAN "2" |
| L3 DELIMITER | 2 | 17≦L3 PACKET SIZE ≦144 |
| TOTAL | X+Y+3 | IN THE CASE OF X=20 AND Y=3, TOTAL IS 26, 26*8*(1/0.02)=10,400(bps) |

FIG. 11

SIZE OF PAYLOAD AND OVERHEAD IN AUXILIARY SERVICE INSTANCE (WHEN OCCUPIED CHANNEL MODE IS USED)

| ELEMENT | SIZE (OCTET) | |
|---|---|---|
| CODEC PAYLOAD | X | IN THE CASE OF G729A (8Kbps) 2 CODEC PAYLOADS, X=20 |
| ROHC PROTOCOL HEADER | Y | IN THE CASE OF SMALL CID AND UDP CHECK SUM, Y=3 |
| PPP HEADER | 0 | OMITTED SINCE CHANNEL IS OCCUPIED (S067) |
| SERVICE INSTANCE FLOW ID | 0 | OMITTED SINCE CHANNEL IS OCCUPIED |
| L3 DELIMITER | 2 | 17≦L3 PACKET SIZE ≦144 |
| TOTAL | X+Y+2 | IN THE CASE OF X=20 AND Y=3, TOTAL IS 25, 25*8*(1/0.02)=10,000(bps) |

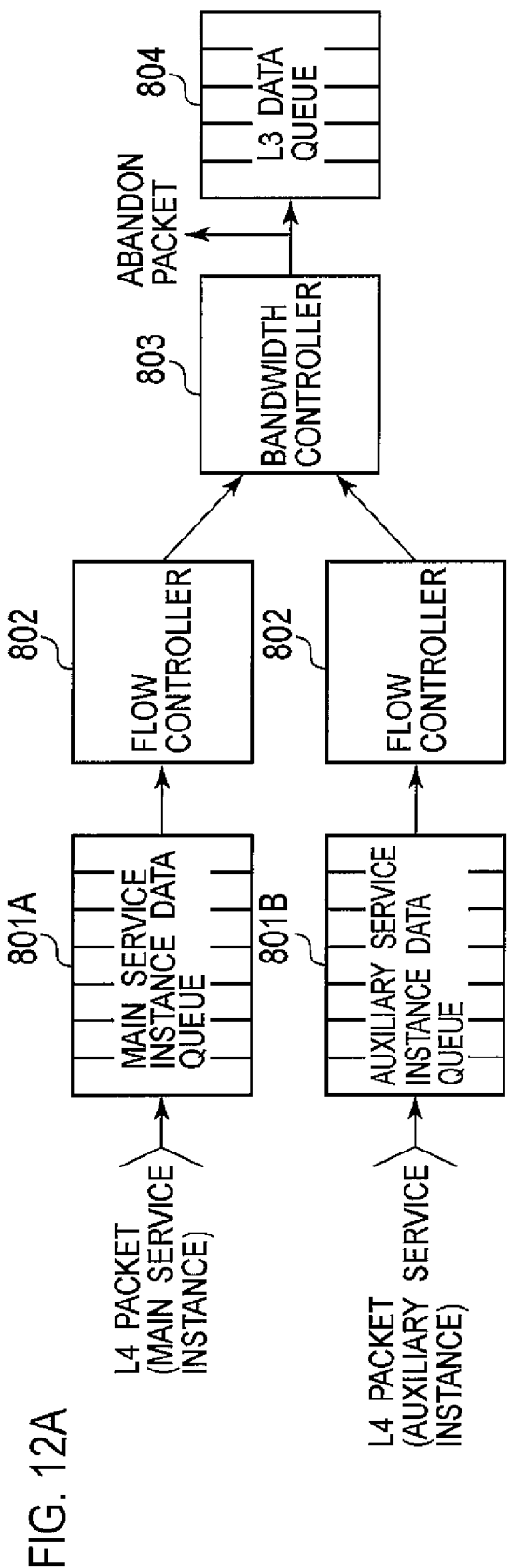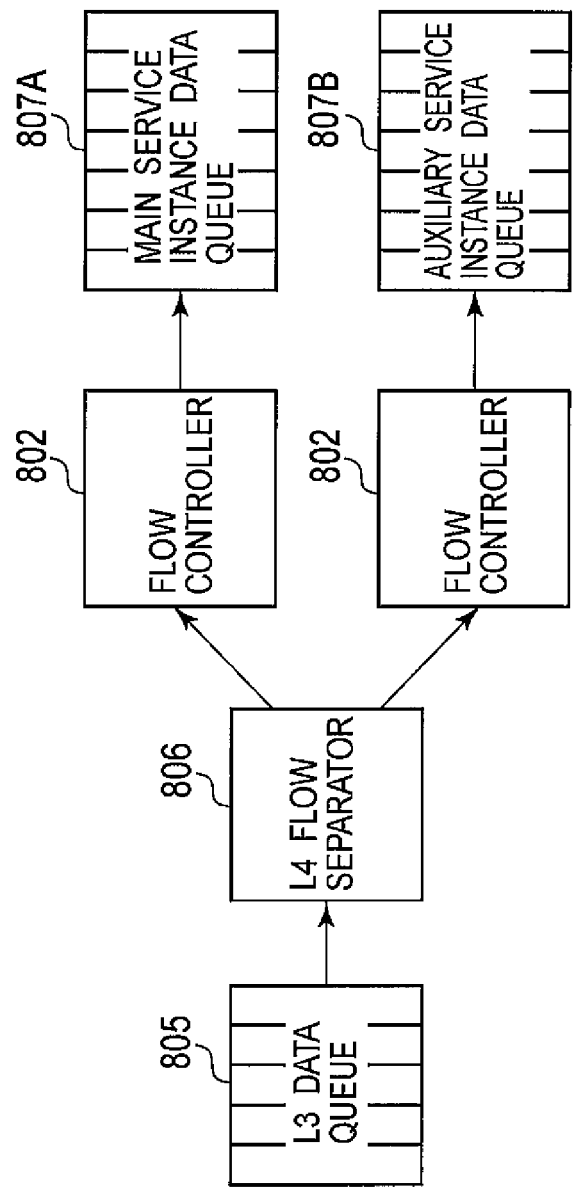

FIG. 15

| MODULATION CLASS | MODULATION AND CODING RATES | | | | | UPLINK THROUGHPUT | | DOWNLINK THROUGHPUT | |
|---|---|---|---|---|---|---|---|---|---|
| | BIT/ SYMBOL | SIGNAL SET | PUNCTURE | SHAPER | BLOCK CODE | MAC PAYLOAD SIZE (bits) | THROUGHPUT (bps) | MAC PAYLOAD SIZE (bits) | THROUGHPUT (bps) |
| 0 | 0.5 | π/2-BPSK | REPEAT | — | — | 56 | 11200 | 192 | 38400 |
| 1 | 0.67 | π/2-BPSK | 1 of 4 | — | — | 80 | 16000 | 264 | 52800 |
| 2 | 1.0 | QPSK | — | — | — | 144 | 28800 | 424 | 84800 |
| 3 | 1.5 | QPSK | 2 of 6 | — | — | 232 | 46400 | 648 | 129600 |
| 4 | 2.0 | 8-PSK | — | — | (64,57) | 304 | 60800 | 824 | 164800 |
| 5 | 2.5 | 8-PSK | — | — | (64,57) | 376 | 75200 | 1008 | 201600 |
| 6 | 3 | 12-QAM | 2 of 6 | 3/4 | (48,47) | 504 | 100800 | 1328 | 265600 |
| 7 | 3.5 | 16-QAM | 2 of 6 | 4/4 | (64,63) | 592 | 118400 | 1560 | 312000 |
| 8 | 4 | 24-QAM | 2 of 6 | 5/4 | (80,79) | — | — | 1784 | 356800 |

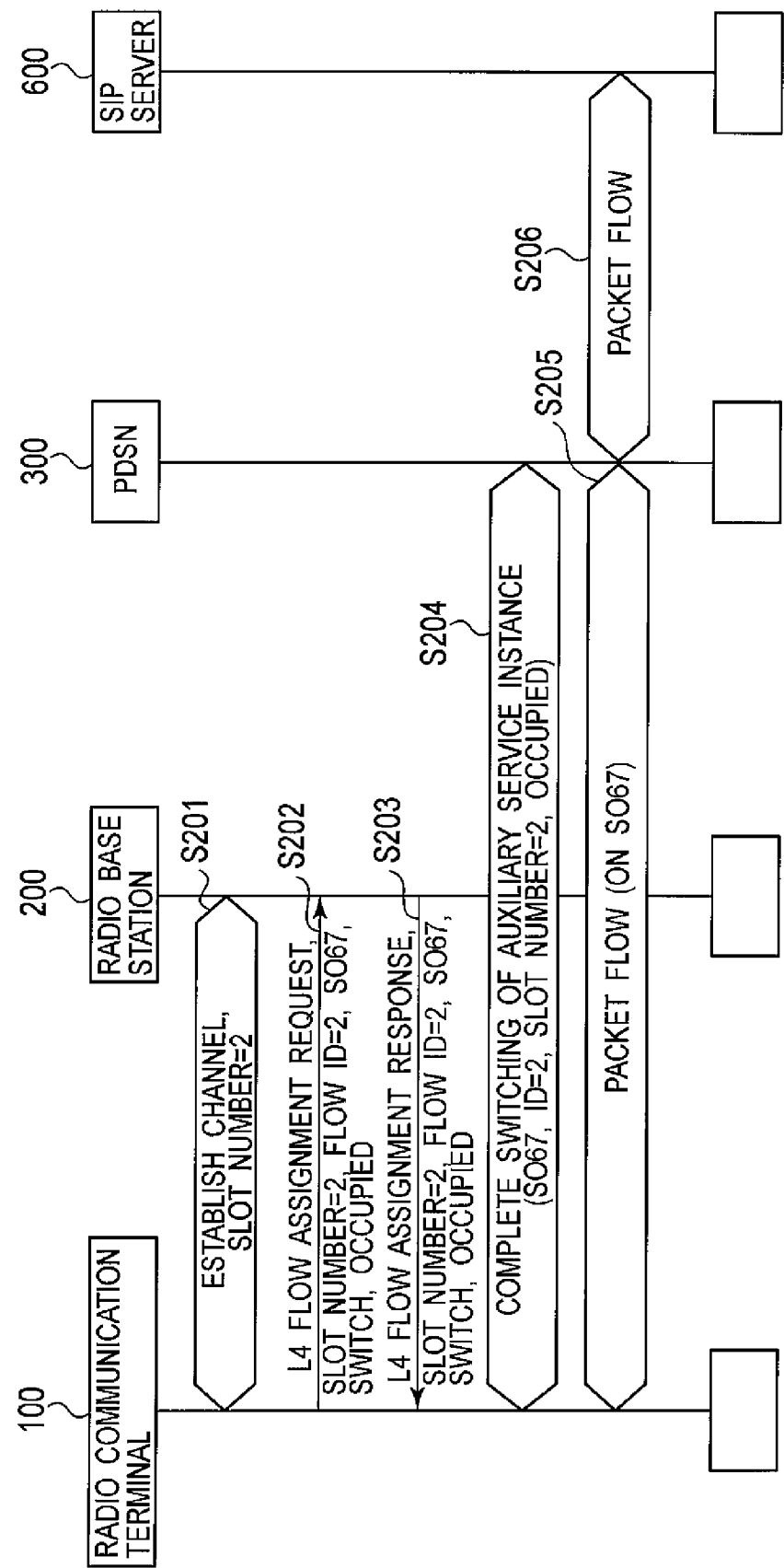

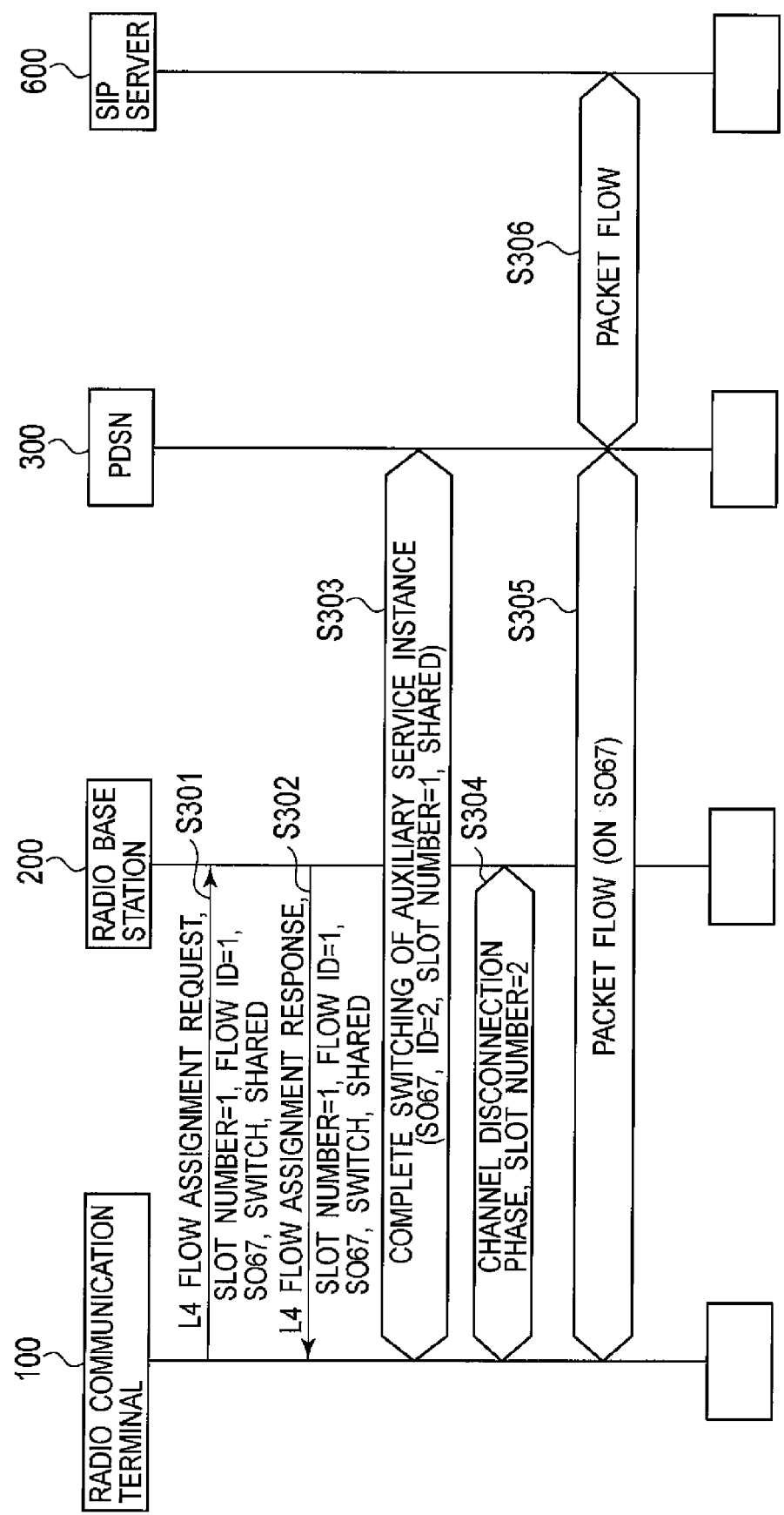

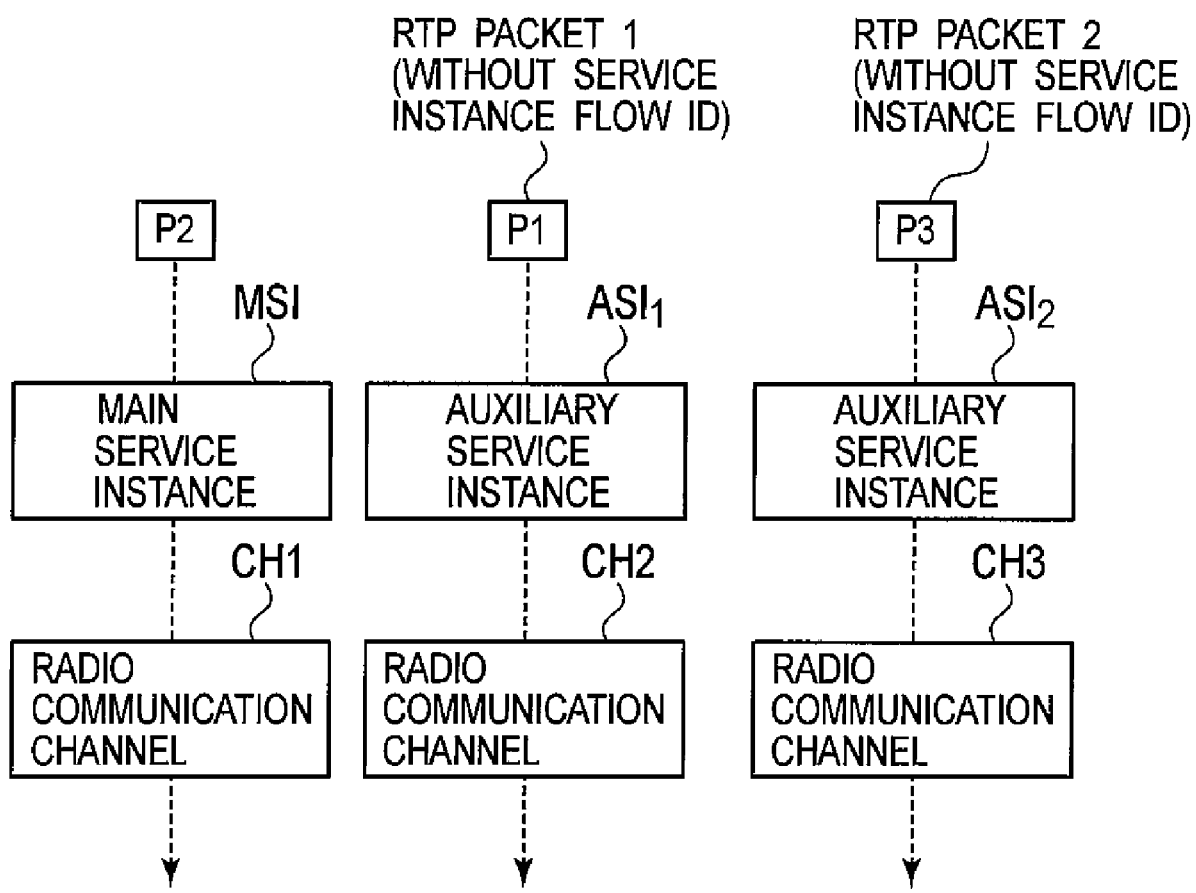

RADIO COMMUNICATION TERMINAL, RADIO BASE STATION, AND PACKET COMMUNICATION METHOD

BACKGROUND OF THE INVENTION

1. Field of the Invention

The present invention relates to a radio communication terminal, a radio base station, and a packet communication method which transmit and receive multiple types of packets.

2. Description of the Related Art

In radio communication systems, it becomes more popular to transmit packets such as a packet including coded voice data which needs transmission delay suppression. In addition to such a type of packets, another type of packets, such as a control packet including control data used for establishing or maintaining communications are also transmitted. The latter type of packets has a low necessity of controlling transmission delay.

To deal with these two types of packets, there is known an approach that sets a first communication session and a second communication session between a radio communication terminal and a communication destination device of the radio communication terminal (see X.S0011-004-D "cdma2000 Wireless IP Network Standard: Quality of Service and Header Reduction" (3GPP2)). The first communication session is a logical communication path used for transmitting a particular type of packet, that is, packet that needs transmission delay suppression. The second communication session is a logical communication path used for transmitting a type of packet different from the particular type of packet.

According to such an approach, QoS control can be performed in which a packet transmitted by using the first communication session has a priority over a packet transmitted by using the second communication session, thereby controlling the transmission delay of the packet transmitted by using the first communication session.

In addition, there has been proposed an approach in which a session identifier to indicate a communication session is added to a header of each packet transmitted by using both a first and a second communication session (see Japanese Patent Application Publication No. 2007-300236).

SUMMARY OF THE INVENTION

In order to distinguish a packet transmitted by using the first communication session from a packet transmitted by using the second communication session in a radio communication between a radio communication terminal and a radio base station, one of the following packet transmission modes (a) and (b) may be used:

(a) A mode disclosed in Japanese Patent Application Publication No. 2007-300236, that is, a mode in which a session identifier is added to a header of each packet to be transmitted by using both the first and second communication sessions.

(b) A mode in which addition of the session identifier to a packet transmitted by using the first communication session is omitted. Specifically, a radio communication channel dedicated for the first communication session is set. Then, a packet is transmitted by using the first communication session through the dedicated radio communication channel, and thus is distinguished from a packet transmitted by using the second communication session.

In the mode (a), the first and second communication sessions can be set in one radio communication channel. Accordingly, if a transmission rate per radio communication channel is high, the transmission rate can be utilized to the utmost extent.

In the mode (b), it is possible to reduce a proportion of a header in the packet transmitted by using the first communication session (that is, a proportion of an overhead). Accordingly, the mode (b) is effective if the transmission rate per radio communication channel is low.

Generally, in a radio communication system, a transmission rate per radio communication channel changes depending on a radio communication quality. However, the approach described in Japanese Patent Application Publication No. 2007-300236, always uses the mode (a), and thus has a problem of not allowing a selection of a packet transmission mode depending on the radio communication quality.

The present invention has been made with a view to overcoming the above-described problem. Accordingly, an object of the present invention is to provide a radio communication terminal, a radio base station, and a packet communication method, which are capable of selecting a packet transmission mode depending on a radio communication quality in a case where multiple communication sessions are set.

A first aspect of the present invention provides a radio communication terminal (a radio communication terminal 100) which transmits and receives multiple types of packets including a particular type of packet (for example, RTP packets) to and from a communication destination device (for example, a PDSN 300, an SIP telephone 500, or an SIP server 600) through a radio base station (a radio base station 200). The radio communication terminal includes: a communication session setting unit (controller 110) configured to set a first communication session and a second communication session between the radio communication terminal and the communication destination device, the first communication session (an auxiliary service instance ASI) being a logical communication path used for transmitting the particular type of packet, the second communication session (main service instance MSI) being a logical communication path used for transmitting a type of packet different from the particular type of packet; a radio quality information acquiring unit (a radio communication information acquiring unit 163) configured to acquire radio quality information (for example, modulation classes) showing a radio quality between the radio communication terminal and the radio base station; a packet transmission mode selector (a packet transmission mode selector 164) configured to select anyone of a first packet transmission mode (a channel shared mode) and a second packet transmission mode (a channel occupied mode) depending on the radio quality information acquired by the radio quality information acquiring unit, the first packet transmission mode including an addition of a session identifier (a service instance flow ID) to the particular type of packet, the session identifier indicating that the particular type of packet is transmitted by using the first communication session, the second packet transmission mode omitting the addition of the session identifier to the particular type of packet; and a session identifier adding unit (a controller 110) configured to add the session identifier to the particular type of packet if the first packet transmission mode is selected by the packet transmission mode selector. The session identifier adding unit omits the addition of the session identifier to the particular type of packet if the second packet transmission mode is selected by the packet transmission mode selector.

According to such aspect of the present invention, in a case where multiple communication sessions are set, a radio communication terminal capable of selecting a packet transmission mode depending on a radio communication quality can be provided.

A second aspect of the present invention relates to the first aspect of the present invention, in which, based on the radio quality information, the packet transmission mode selector determines whether or not the radio quality is improved, and, selects the first packet transmission mode when it is determined that the radio quality is improved.

A third aspect of the present invention relates to the first aspect of the present invention, in which, based on the radio quality information, the packet transmission mode selector determines whether or not the radio quality is deteriorated, and selects the second packet transmission mode when it is determined that the radio quality is deteriorated.

A fourth aspect of the present invention relates to the first aspect of the present invention and further includes a radio communication channel setting unit (radio communication unit 102) configured to set a radio communication channel (radio communication channel CH) between the radio communication terminal and the radio base station, the radio communication channel being formed of at least one physical channel defined by a physical resource. In the fourth aspect of the present invention, the communication session setting unit sets the first and second communication sessions on the same radio communication channel if the first packet transmission mode is selected by the packet transmission mode selector.

A fifth aspect of the present invention relates to the fourth aspect of the present invention, in which the radio communication channel setting unit sets the radio communication channel dedicated for the first communication session, if the second packet transmission mode is selected by the packet transmission mode selector, and the communication session setting unit sets the first communication session on the radio communication channel dedicated for the first communication session, if the second packet transmission mode is selected by the packet transmission mode selector.

A sixth aspect of the present invention relates to the first aspect of the present invention, in which the particular type of packet is a packet which needs to be transmitted with a transmission delay shorter than that for the type of packet different from the particular type of packet.

A seventh aspect of the present invention provides a radio base station (a radio base station 200) which transmits and receives a plurality of types of packets including a particular type of packet to and from a radio communication terminal (a radio communication terminal 100). The radio base station includes: a communication session setting unit (a controller 210) configured to set a first communication session and a second communication session between the radio communication terminal and a communication destination device of the radio communication (for example, a PDSN 300, an SIP telephone 500, or an SIP server 600), the first communication session being a logical communication path used for transmitting the particular type of packet, the second communication session being a logical communication path used for transmitting a type of packet different from the particular type of packet; a radio quality information acquiring unit (a radio communication information acquiring unit 263) configured to acquire radio quality information showing a radio quality between the radio base station and the radio communication terminal; a packet transmission mode selector (a mode selector 264) configured to select any one of a first packet transmission mode and a second packet transmission mode depending on the radio quality information acquired by the radio quality information acquiring unit, the first packet transmission mode including an addition of a session identifier to the particular type of packet, the session identifier indicating that the particular type of packet is transmitted by using the first communication session, the second packet transmission mode omitting the addition of the session identifier to the particular type of packet; and a session identifier adding unit (a controller 210) configured to add the session identifier to the particular type of packet if the first packet transmission mode is selected by the packet transmission mode selector. The session identifier adding unit omits the addition of the session identifier to the particular type of packet if the second packet transmission mode is selected by the packet transmission mode selector.

According to such aspect, in a case where multiple communication sessions are set, a radio base station capable of selecting a packet transmission mode depending on a radio communication quality can be provided.

An eight aspect of the present invention is a packet communication method for transmitting and receiving a plurality of types of packets including a particular type of packet through a radio base station between a radio communication terminal and a communication destination device with which the radio communication terminal communicates. The packet communication method comprising the steps of: setting a first communication session and a second communication session between the radio communication terminal and the communication destination device, the first communication session being a logical communication path used for transmitting the particular type of packet, the second communication session being a logical communication path used for transmitting a type of packet different from the particular type of packet; acquiring radio quality information showing a radio quality between the radio communication terminal and the radio base station; selecting any one of a first packet transmission mode and a second packet transmission mode depending on the radio quality information acquired in the acquiring step, the first packet transmission mode including an addition of a session identifier to the particular type of packet, the session identifier indicating that the particular type of packet is transmitted by using the second communication session, the second packet transmission mode omitting the addition of the session identifier to the particular type of packet; adding the session identifier to the particular type of packet if the first packet transmission mode is selected in the selecting step; and omitting the addition of the session identifier to the particular type of packet if the second packet transmission mode is selected in the selecting step.

According to such aspect, in a case where multiple communication sessions are set, a packet communication method capable of selecting a packet transmission mode depending on a radio communication quality can be provided.

As described above, the present invention can provide a radio communication terminal, a radio base station, and a packet communication method, which are capable of selecting a packet transmission mode depending on a radio communication quality in a case where multiple communication sessions are set.

BRIEF DESCRIPTION OF THE DRAWINGS

FIG. 9 is a table showing a size of a payload and header in the main service instance according to the embodiment of the present invention.

FIG. 10 is a table showing a size of a payload and header in the auxiliary service instance (when the shared channel mode is used) according to the embodiment of the present invention.

FIG. 11 is a table showing a size of a payload and header in the auxiliary service instance (when the occupied channel mode is used) according to the embodiment of the present invention.

FIGS. 12A and 12B are diagrams for illustrating packet flow control processing in the shared channel mode according to the embodiment of the present invention.

FIG. 15 is a diagram showing a modulation class of adaptive modulation carried out in the radio communication terminal and the radio base station according to the embodiment of the present invention.

FIG. 17 is a sequence diagram showing an operation of switching from the shared channel mode to the occupied channel mode according to the embodiment of the present invention.

FIG. 18 is a sequence diagram showing an operation of switching from the occupied channel mode to the shared channel mode according to the embodiment of the present invention.

FIG. 19 is a diagram showing a modified example of the auxiliary service instance according to the embodiment of the present invention.

DESCRIPTION OF THE PREFERRED EMBODIMENTS

Figure 1:
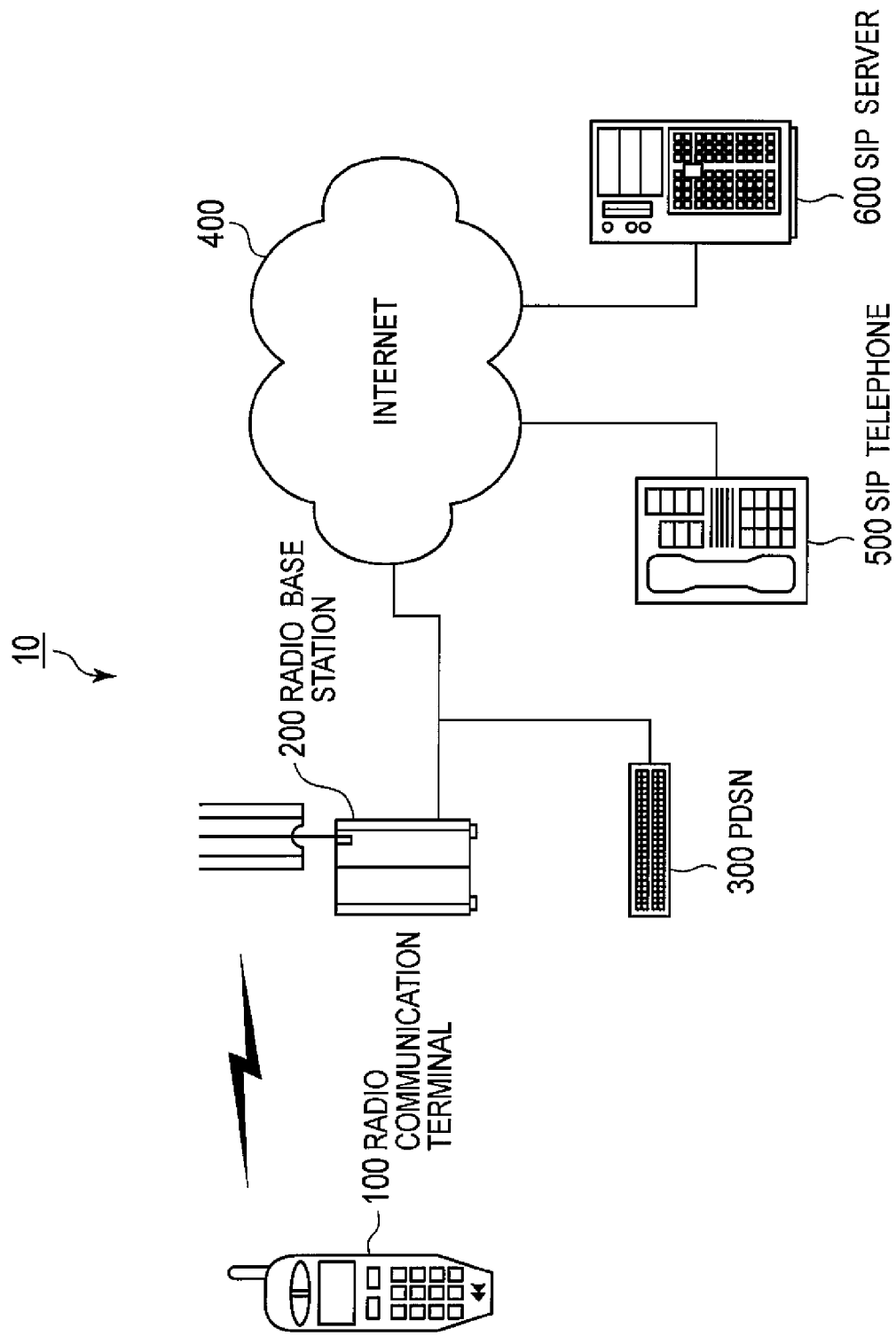
FIG. 1 is a general schematic configuration diagram of a communication system according to an embodiment of the present invention.

Next, a communication system according to an embodiment of the present invention will be described by referring to the drawings. In the following description of the drawings in the embodiment, same or similar reference numerals are given to denote same or similar portions.

The description will be given in the following order: (1) Outline of the Communication System, (2) Configuration of the Communication System, (3) Shared Channel Mode and Occupied Channel Mode, (4) Packet Configuration in Each Service Instance, (5) Packet Flow Control Processing, (6) Communication Flame Configuration and Adaptive Modulation, (7) Detailed Operation of the Communication System, (8) Advantageous Effects, and (9) Other Embodiments.

(1) Outline of the Communication System

Firstly, a schematic configuration of a communication system according to an embodiment of the present invention will be described by referring to FIGS. 1 to 3. Specifically, (1.1) General configuration of the communication system, (1.2) Schematic operation of the communication system, and (1.3) Protocol stack will be described.

(1.1) General Configuration of the Communication System

FIG. 1 is a general schematic configuration diagram of a communication system 10 according to the embodiment of the present invention. In the present embodiment, a communication system 10 which is applied to a VoIP (Voice over Internet Protocol) will be described.

As shown in FIG. 1, the communication system 10 according to the present embodiment includes a radio communication terminal 100, a radio base station 200, a packet data serving node (PDSN) 300, the Internet 400, a session initiation protocol (SIP: RFC 3261 IETF) telephone 500, and an SIP server 600.

The radio communication terminal 100 and the radio base station 200 have a configuration based on iBurst (a registered trademark) system which is a radio communication system capable of high-speed communications (for iBurst, see "High Capacity-Spatial Division Multiple Access (HC-SDMA)" ATIS-PP-0700-004. 2007 (ATIS/ANSI)"). In iBurst system, TDMA and SDMA/TDD communication modes are used.

The radio communication terminal 100, the radio base station 200, and the PDSN 300 are compatible with QoS control according to the above-described X.S0011-004-D. In X.S0011-004-D, the mechanism to reserve a bandwidth guarantees the QoS of packet flow which is transmitted from and received by a real-time application.

In the QoS control in X.S0011-004-D, multiple service instances are configured in one point-to-point-protocol (PPP) connection. In the present embodiment, the service instance means an abstract example of a propagation path for transferring packet flow. In X.S0011-004-D, the service instance is defined by types of service options (SO) to which different functions are respectively given.

As described above, the multiple service instances are set and are given of different types of QoS, and as a result, detailed QoS control can be achieved.

(1.2) Schematic Operation of the Communication System

Figure 2:
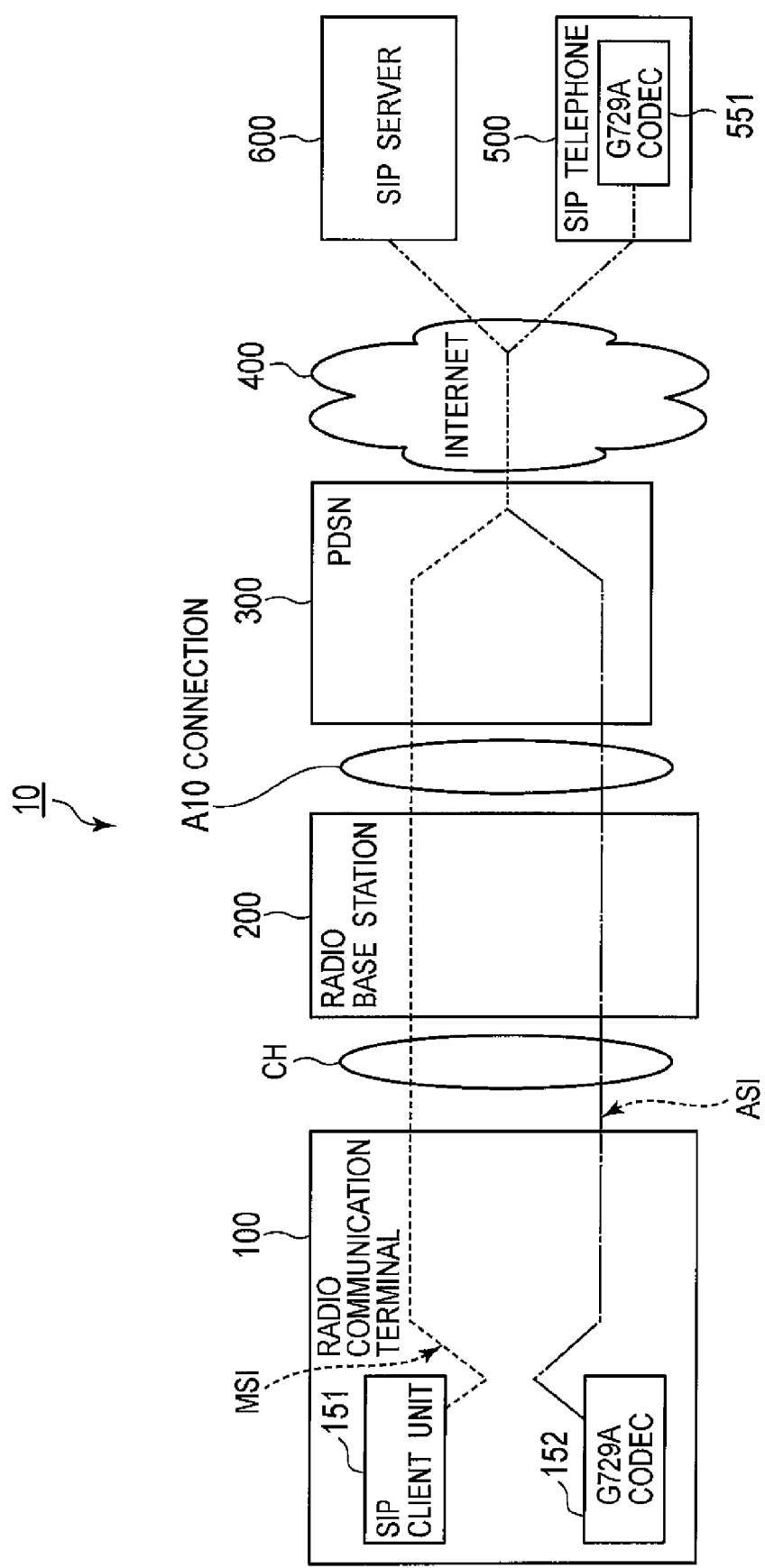
FIG. 2 is a functional block configuration diagram for illustrating a schematic operation of the communication system according to the embodiment of the present invention.

FIG. 2 is a block configuration diagram for illustrating a schematic operation of the communication system 10. In FIG. 2, the radio communication terminal 100 includes an SIP client unit 151 and a G729A codec 152. The SIP telephone 500 includes a G729A codec 551.

The radio communication terminal 100 firstly gives the radio base station 200 a request of radio connection. The radio base station 200 accepts the radio connection request from the radio communication terminal 100.

After that, the radio communication terminal 100 and the radio base station 200 set a radio communication channel CH. The radio communication channel is configured by using at least one physical channel. In the present embodiment, a timeslot is equivalent to the physical channel.

The radio base station 200 has a function to relay packet flow transmitted and received between the radio communication terminal 100 and the PDSN 300. In addition, the radio base station 200 sets A10 connection between the radio base station 200 and the PDSN 300 by using an A11 signaling protocol.

The radio communication terminal 100, the radio base station 200, and the PDSN 300 establish a main service instance (a second communication session) MSI between the radio communication terminal 100 and the PDSN 300 after the radio communication channel CH and the A10 connection are set.

The radio communication terminal 100 firstly establishes a main service instance MSI at the time of starting communications, for example, when turning the radio communication terminal 100 on. In the present embodiment, the main service instance MSI is established on one physical channel when the PPP connection between the radio communication terminal 100 and PDSN 300 is established.

If the service instance is established while the radio communication terminal 100, the radio base station 200, and the PDSN 300 have not established a service instance, the established service instance is recognized as a main service instance MSI.

One main service instance MSI only exists for one PPP connection. The main service instance MSI is used for transmitting all the packet flows which do not pass through other service instances.

Specifically, the radio communication terminal 100 and the radio base station 200 store the association between the main service instance MSI and the radio communication channel CH. The radio base station 200 and the PDSN 300 store the association between the main service instance MSI and the A10 connection.

Then, the radio communication terminal 100 transmits a PPP connection request through the main service instance MSI to the PDSN 300.

The PDSN 300 functions as a PPP server. The PDSN 300 accepts the PPP connection request from the radio communication terminal 100 and assigns a global IP address to the radio communication terminal 100.

As a result, the radio communication terminal 100 can communicate with a network device connected to the Internet 400, by using the global IP address assigned by the PDSN 300. In the present embodiment, the radio communication terminal 100 executes SIP telephone with the SIP telephone 500.

When the SIP telephone is started, the radio communication terminal 100 negotiates with the SIP server 600. Then, the radio communication terminal 100 negotiates with the PDSN 300 according to a resource reservation protocol (RSVP) which is defined by X.S0011-004-D, and establishes an auxiliary service instance (a first communication session) ASI.

Specifically, if the radio communication terminal 100, the radio base station 200, and the PDSN 300 establish an additional service instance while the main service instance MSI has been already established, the additionally established service instance is recognized as an auxiliary service instance ASI. In this case, the radio communication terminal 100 does not exchange information for a PPP establishment and does not acquire the global IP address from the PDSN 300.

A packet type selection method and a transmission method, which are negotiated according to RSVP, are applied to the auxiliary service instance ASI. As the packet type selection method, for example, contents such as an IP address of the SIP telephone 500, a UDP port number to be used, RTP payload being G729A (8 Kbps), and the like, are negotiated.

As the transmission method, for example, use of robust header compression (ROHC: RFC 3095 IETF) is negotiated.

In this manner, the packet type flowing through the auxiliary service instance ASI is limited so that special QoS can be given to the packet flow which is transmitted from and received by a real-time application.

The radio communication terminal 100 and the radio base station 200 store the association between the auxiliary service instance ASI and the radio communication channel CH. The radio base station 200 and the PDSN 300 store the association between the auxiliary service instance ASI and the A10 connection.

Once the auxiliary service instance ASI is established, the SIP server 600 establishes a RTP session for SIP telephone between the radio communication terminal 100 and the SIP telephone 500. Incidentally, the SIP is a protocol which connects a packet stream using RTP/UDP/IP protocol between any internet nodes. Once the RTP session is established, the radio communication terminal 100 can execute SIP telephone with the SIP telephone 500.

Incidentally, in the auxiliary service instance ASI, the type has been negotiated for each packet flow in advance, and thus an overhead which occurs specifically to the packet flow can be omitted. For example, in the service option 67 (SO67) in X.S0011-004-D, the auxiliary service instance ASI only transmits a packet of PPP flow, to which ROHC is applied. In the SO67, the PPP overhead is omitted.

(1.3) Protocol Stack

Next, a protocol stack in the communication system 10 will be described by referring to FIGS. 3 and 4.

Figure 3:
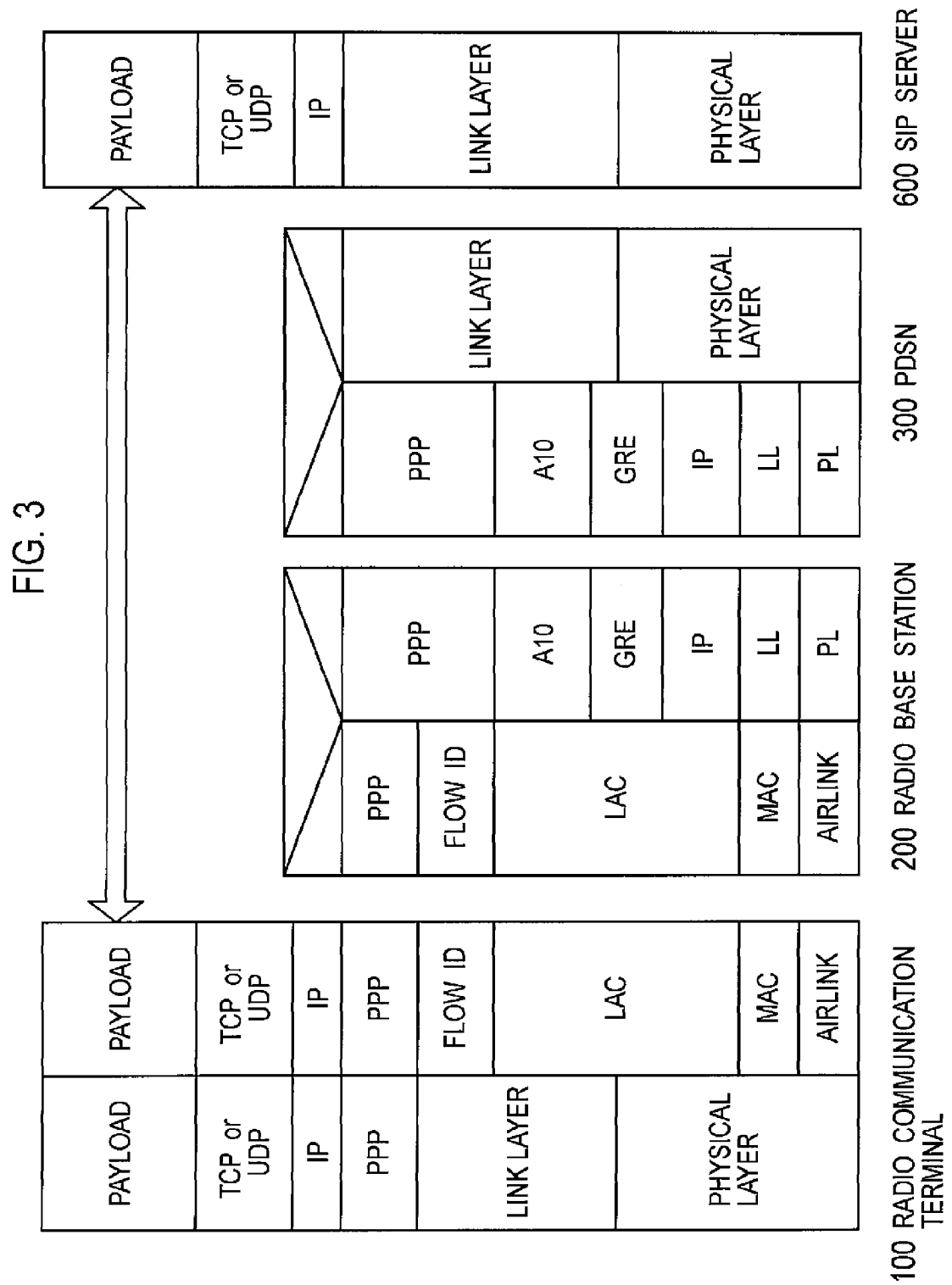
FIG. 3 is a diagram showing a protocol stack which is applied to a main service instance in the communication system according to the embodiment of the present invention.
Figure 4:
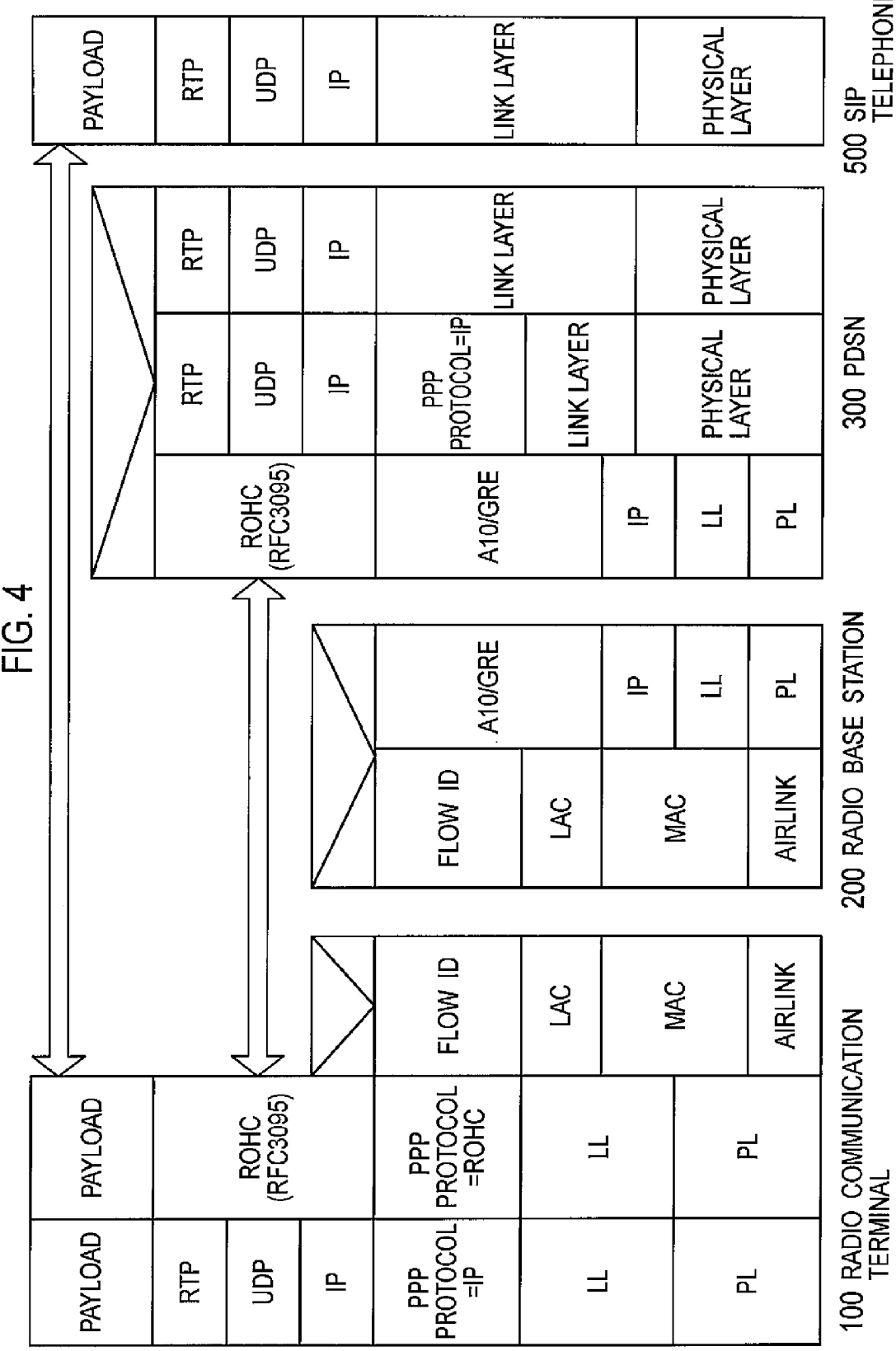
FIG. 4 is a diagram showing a protocol stack which is applied to an auxiliary service instance in the communication system according to the embodiment of the present invention.

FIG. 3 is a diagram showing a protocol stack which is applied to the main service instance MSI in the communication system 10. FIG. 4 is a diagram showing a protocol stack which is applied to the auxiliary service instance ASI in the communication system 10.

The main service instance MSI is used for transmitting all the packet flows which do not pass through the auxiliary service instance ASI. Accordingly, ROHC compression is not performed and a special process is not performed in a layer higher than PPP.

In contrast, the auxiliary service instance ASI is used for transmitting media packets such as voices and moving images. Accordingly, UDP (RFC 768 IETF) and RTP (RFC 1889 IETF) are used by using IP (RFC 791 IETF) as a lower layer. In addition, the overhead of the PPP header is removed between the radio communication terminal 100 and the radio base station 200.

The ROHC is implemented on the radio communication terminal 100 and the PDSN 300 in the auxiliary service instance ASI. In the ROHC, the RTP/UDP/IP packet header, which is totally 40 bytes, is compressed by 2 bytes at minimum. Incidentally, in the voice communication over VoIP, two G729A (8 Kbps) codec packets are stored in one RTP/UDP/IP packet.

The service instance between the radio base station 200 and the PDSN 300 is achieved by the A10 connection according to generic routing encapsulation (GRE) RFC 2784. By establishing multiple A10 connections in one PPP connection, multiple service instances are established between the radio base station 200 and the PDSN 300.

(2) Configuration of the Communication System

Next, descriptions will be given for configurations of the is radio communication terminal 100, the radio base station 200, and the PDSN 300, which constitute the communication system 10, all of which constitute the communication system 10, by referring to FIGS. 5 to 7.

(2.1) Configuration of the Radio Communication Terminal

Figure 5:
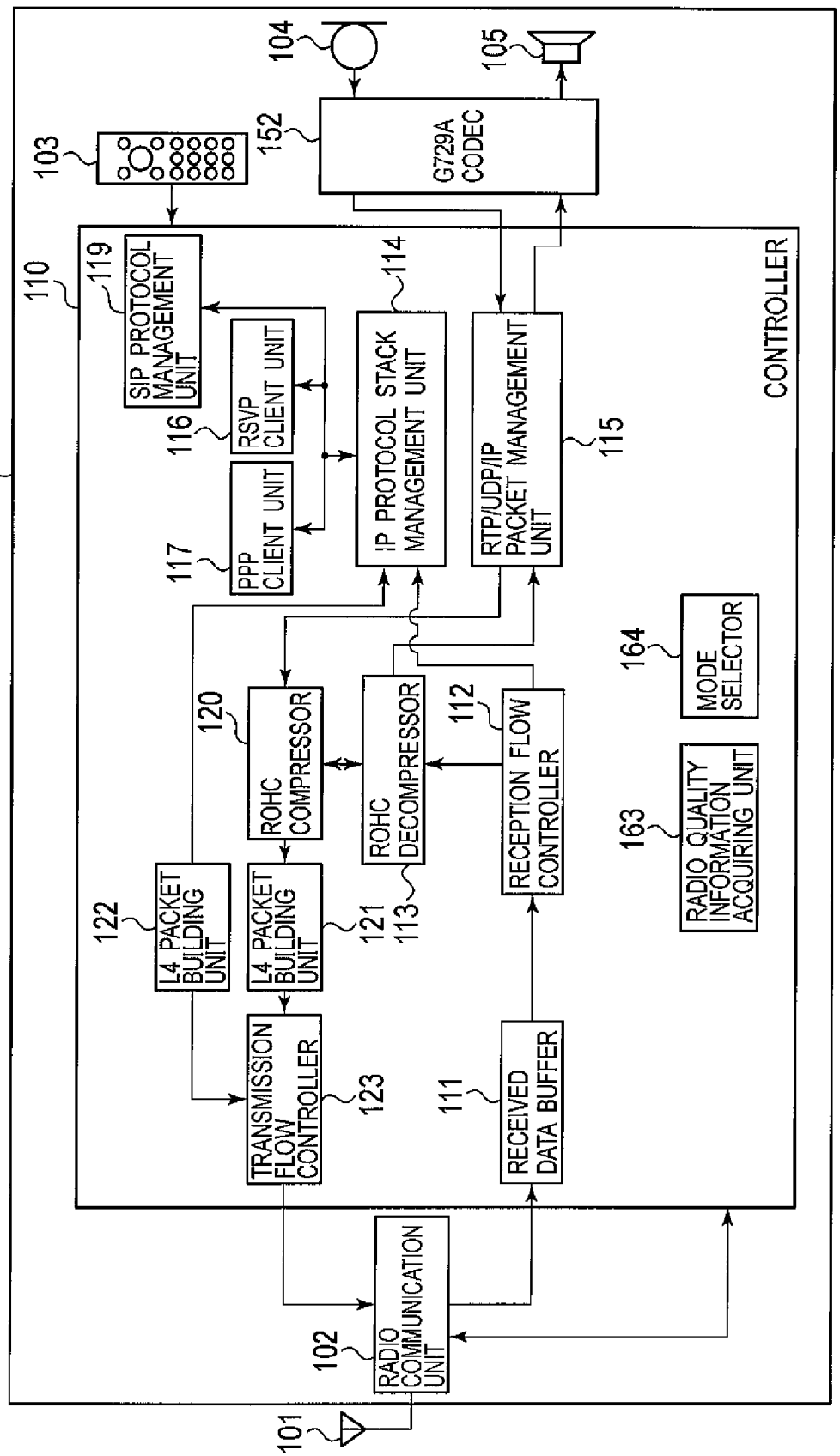
FIG. 5 is a functional block configuration diagram of a radio communication terminal according to the embodiment of the present invention.

FIG. 5 is a functional block configuration diagram of the radio communication terminal 100. As shown in FIG. 5, the radio communication terminal 100 includes an antenna 101, a radio communication unit 102, a keypad 103, a microphone 104, a speaker 105, a G729A codec 152, and a controller 110.

In the present embodiment, the controller 110 functions as a communication session setting unit configured to set the main service instance MSI (the second communication session) and the auxiliary service instance ASI (the first communication session). Also, the controller 110 functions as an identifier adding unit configured to add an identifier for indicating the auxiliary service instance ASI to a packet.

Furthermore, the controller 110 includes a received data buffer 111, a reception flow controller 112, a ROHC decompressor 113, an IP protocol stack management unit 114, a RTP/UDP/IP packet management unit 115, a RSVP client unit 116, a PPP client unit 117, an SIP protocol management unit 119, a ROHC compressor 120, an L4 packet building units 121 and 122, a transmission flow controller 123, a radio quality information acquiring unit 163, and a mode selector 164.

The radio communication unit 102 sets the radio communication channel CH between the radio communication terminal 100 and the radio base station 200. In addition, the radio communication unit 102 executes an adaptive modulation (link adaptation) based on a reception SINR.

The transmission flow controller 123 has a function to negotiate with the radio base station 200. The transmission flow controller 123 stores and retains contexts such as a packet context of the auxiliary service instance ASI, a type of service option, and a flow ID.

The radio quality information acquiring unit 163 acquires radio quality information showing a radio quality between the radio communication terminal 100 and the radio base station 200, from the radio communication unit 102. The mode selector 164 selects any one of a shared channel mode and an occupied channel mode which are described later, depending on the acquired radio quality information.

The G729A codec 152 perform sampling of voice data from the microphone 104 and converts the sampled data to a codec payload.

The converted voice data is compressed by the ROHC compressor 120 through the RTP/UDP/IP packet management unit 115. The resultant ROHC-compressed RTP/UDP/IP packet is transmitted through the L4 packet building unit 121 and the transmission flow controller 123.

At that time, the radio communication unit 102 transmits the packet to the radio base station 200 by using the radio communication channel CH corresponding to the auxiliary service instance ASI.

When the radio communication unit 102 receives a packet from the radio communication channel CH corresponding to the auxiliary service instance ASI, the received packet is inputted to the reception flow controller 112 through the received data buffer 111.

The reception flow controller 112 controls whether the received packet is inputted to the ROHC decompressor 113 or to the IP protocol stack management unit 114, based on the type of service instance associated with the radio communication channel CH.

Then, the G729 codec 152 converts G729A (8 Kbps) voice data received from the radio base station 200 into voice data, and outputs the voice data from the speaker 105 as voice.

An operation of each buffer (data queue) will be described later in detail.

(2.2) Configuration of the Radio Base Station 200

Figure 6:
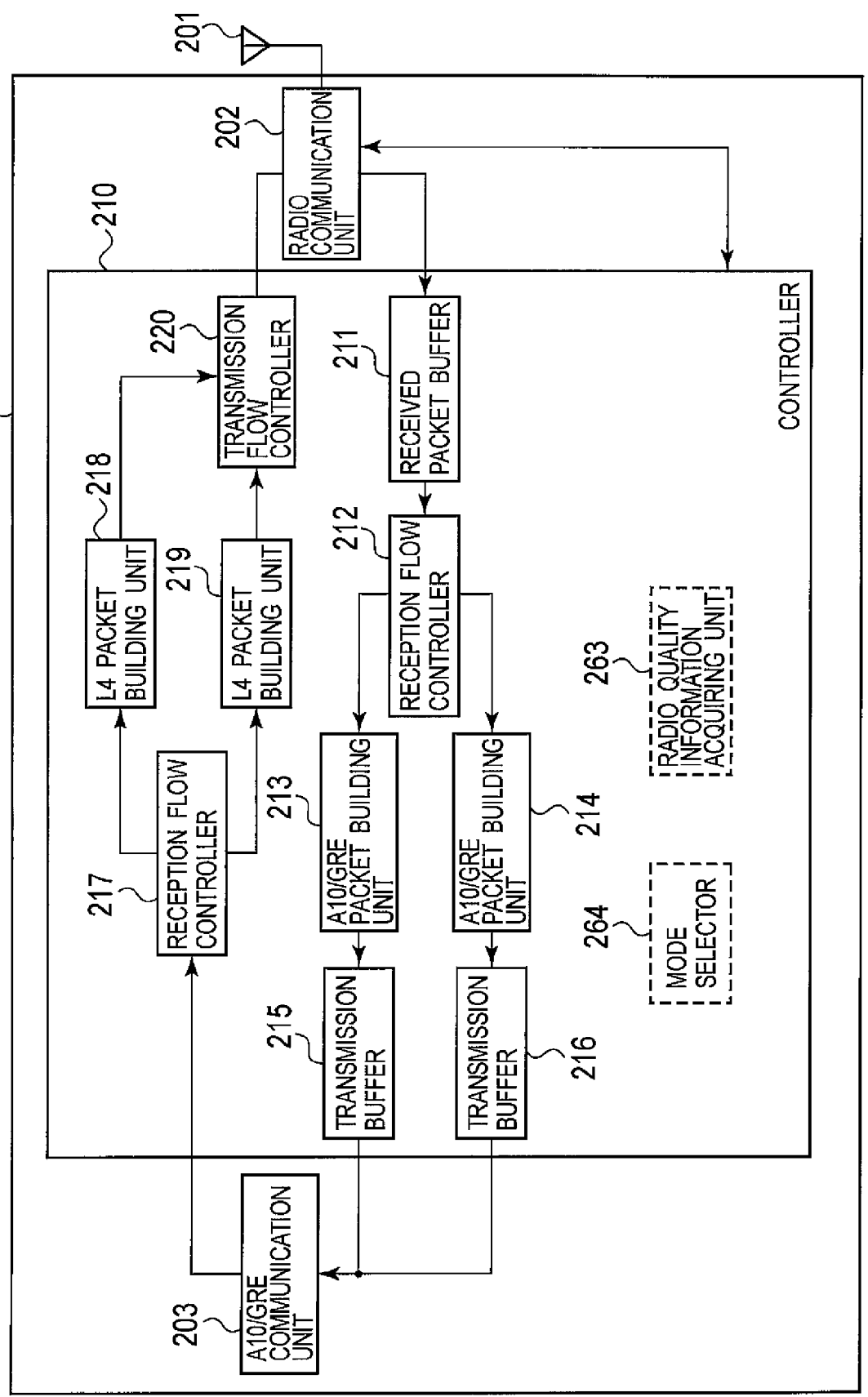
FIG. 6 is a functional block configuration diagram of a radio base station according to the embodiment of the present invention.

FIG. 6 is a functional block configuration diagram of the radio base station 200. As shown in FIG. 6, the radio base station 200 includes an antenna 201, a radio communication unit 202, an A10/GRE communication unit 203, and a controller 210.

The controller 210 includes a received packet buffer 211, a reception flow controller 212, A10/GRE packet building units 213 and 214, transmission buffers 215 and 216, a reception flow controller 217, L4 packet building units 218 and 219, and a transmission flow controller 220.

The A10/GRE communication unit 203 is a functional block for realizing an interface between the radio base station 200 and the PDSN 300. The packet received from the A10/GRE communication unit 203 is transmitted to the reception flow controller 217.

According to the type of service instance associated with the A10 connection, the transmission flow controller 220 switches whether to transmit the received packet to a transmission buffer for the radio communication channel CH associated with the main service instance MSI or to a transmission buffer for the radio communication channel CH associated with the auxiliary service instance ASI.

In addition, the transmission flow controller 220 negotiates with the radio communication terminal 100 and stores and retains the packet contexts of the auxiliary service instance ASI.

The radio communication unit 202 is a functional block for realizing an interface with the radio communication terminal 100 by establishing the radio communication channel CH between the radio base station 200 and the radio communication terminal 100.

According to the type of service instance associated with the radio communication channel CH, the reception flow controller 212 switches whether to transmit the received packet to a transmission buffer for the A10 connection channel associated with the main service instance MSI or to a transmission buffer for the A10 connection channel associated with the auxiliary service instance ASI.

(2.3) Configuration of the PDSN 300

Figure 7:
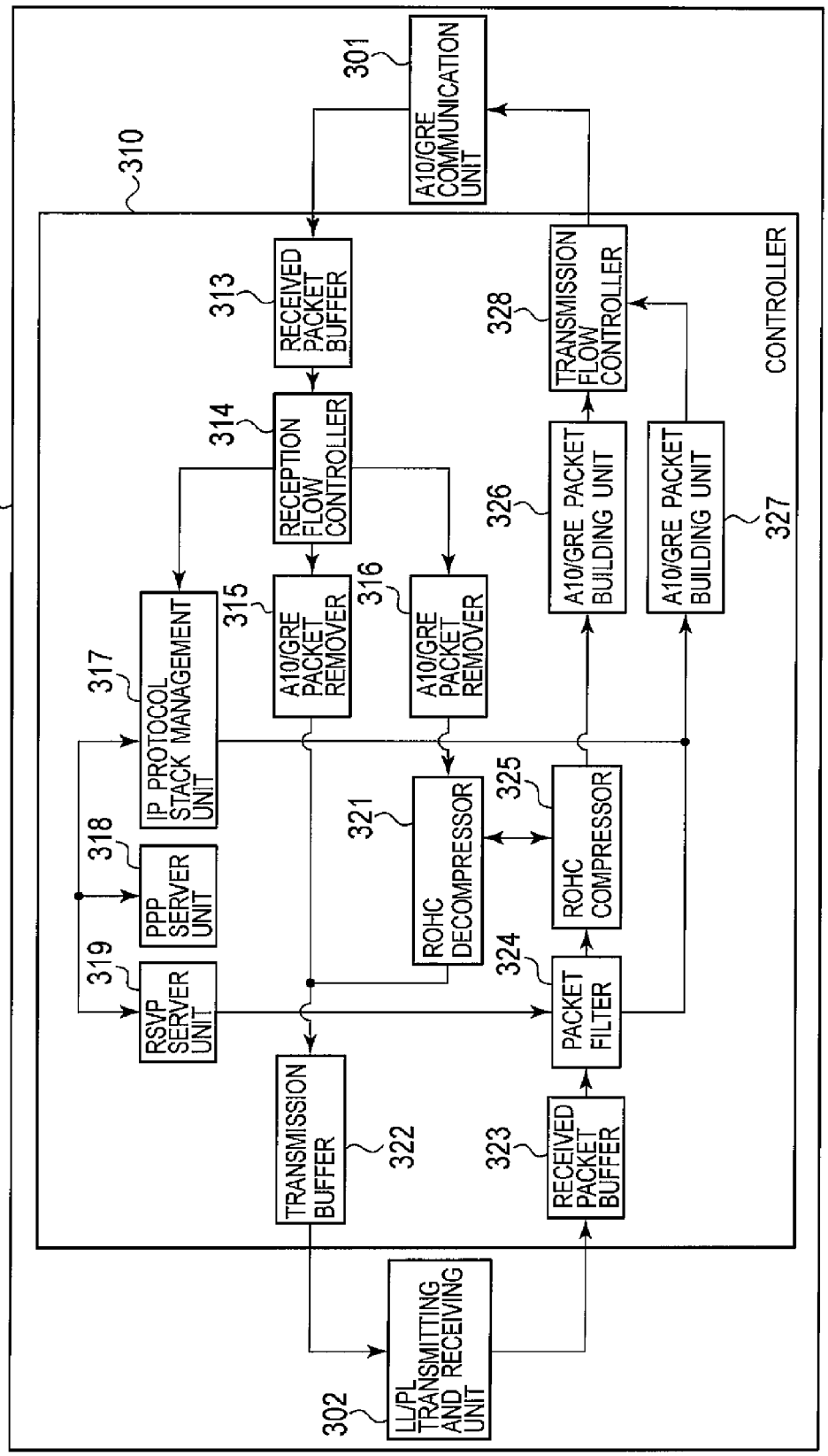
FIG. 7 is a functional block configuration diagram of PDSN according to the embodiment of the present invention.

FIG. 7 is a functional block configuration diagram of the PDSN 300. As shown in FIG. 7, the PDSN 300 has an A10/GRE communication unit 301, an LL/PL transmitting and receiving unit 302, and a controller 310.

The LL/PL transmitting and receiving unit 302 is a functional block for realizing an interface with the Internet 400 at a link layer (LL) level and a physical layer (PL) level. The A10/GRE communication unit 301 is a functional block for realizing an interface with the radio base station 200.

The controller 310 includes a received packet buffer 313, a reception flow controller 314, A10/GRE packet removers 315 and 316, an IP protocol stack management unit 317, a PPP server unit 318, a RSVP server unit 319, a ROHC decompressor 321, a transmission buffer 322, a received packet buffer 323, a packet filter 324, a ROHC compressor 325, A10/GRE packet building units 326 and 327, and a transmission flow controller 328.

A packet from the LL/PL transmitting and receiving unit 302 is distributed by the packet filter 324 according to the standard obtained through a negotiation with the radio communication terminal 100 based on RSVP. Specifically, the packet filter 324 distributes the packet to any one of the A10/GRE packet building unit 326 associated with the auxiliary service instance ASI and the A10/GRE packet building unit 327 associated with the main service instance MSI.

The transmission flow controller 328 negotiates with the radio communication terminal 100 by using the RSVP protocol, and then stores and retains contexts such as a service option and a flow ID.

The packets included in the main service instance MSI among the packets received from the A10/GRE communication unit 301, include packets, for example, PPP, RSVP, and the like which are to be transmitted from the radio communication terminal 100 to the PDSN 300. The reception flow controller 314 inputs the packet to be transmitted to the PDSN 300 to the IP protocol stack management unit 317.

The packets which are transmitted through the main service instance and have destinations other than the PDSN 300 are transmitted to the LL/PL transmitting and receiving unit 302 after the A10/GRE headers are removed by the A10/GRE packet removers 315 and 316.

If the received packets include packets transmitted through the auxiliary service instance ASI, the reception flow controller 314 inputs the packets into the ROHC decompressor 321 after the A10/GRE headers are removed from the packets. The ROHC decompressor 321 reconstructs the IP packet by ROHC decompression, and then transmits the IP packet to the LL/PL transmitting and receiving unit 302.

(3) Shared Channel Mode and Occupied Channel Mode

Next, the aforementioned shared channel mode and occupied channel mode will be described by referring to FIG. 8. Specifically, a concrete method for setting a service instance in a radio communication between the radio communication terminal 100 and the radio base station 200 will be described.
(3.1) Shared Channel Mode (First Packet Transmission Mode)

Figure 8:
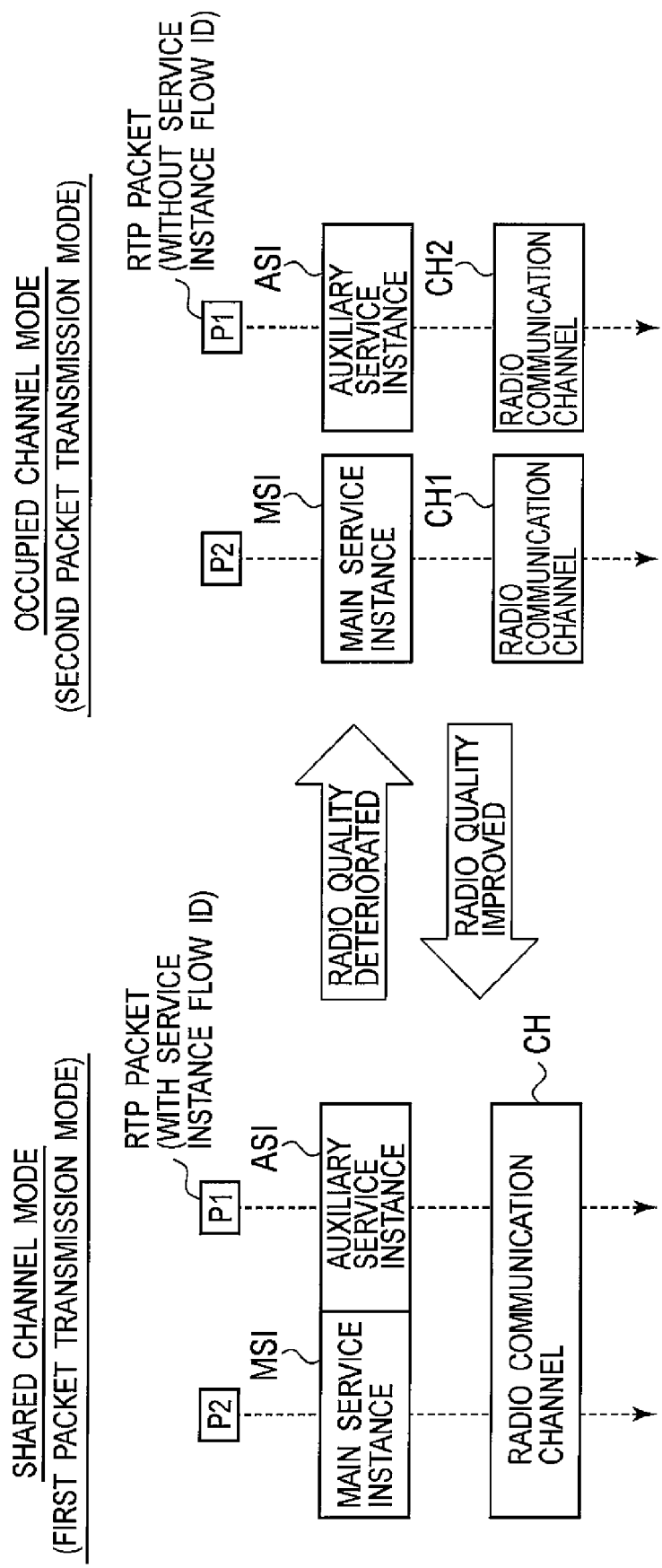
FIG. 8 is a conceptual diagram for illustrating a shared channel mode and an occupied channel mode according to the embodiment of the present invention.

As shown in FIG. 8, in the shared channel mode, the radio communication terminal 100 and the radio base station 200 set the main service instance MSI and the auxiliary service instance ASI on one radio communication channel CH.

For this reason, in the shared channel mode, an identifier for indicating a service instance is buried as an overhead in a header of a packet P1 to be transmitted through the auxiliary service instance ASI. In the present embodiment, the identifier is referred to as a service instance flow ID (a session identifier).

With this configuration, in exchange for the overhead, one radio communication channel CH can be shared among multiple service instances. If the bandwidth of the radio communication channel CH is wide and the overhead is sufficiently small, the decrease of the bandwidth caused by such overhead becomes non-dominant.

Accordingly, with the shared channel mode, if the bandwidth of the radio communication channel CH is wide, the radio communication terminal 100 and the radio base station 200 can effectively take an advantage of the bandwidth. It is to be noted that in the present embodiment, the shared channel mode is selected when the radio communication terminal 100 and the radio base station 200 start a communication with each other.

Furthermore, another packet P1 having a lower priority order can be transmitted by using the main service instance MSI. At this time, only one radio communication channel CH is used, and another radio communication channel CH can be used for another application. Thus, the radio communication resource can be effectively utilized.

On the other hand, if the radio communication terminal 100 is positioned in, for example, a cell edge, there is a case where only an extremely narrow bandwidth can be secured. Accordingly, the decrease in bandwidth caused by the overhead of the service instance flow ID cannot be relatively neglected.

In addition, in the shared channel mode, if the radio bandwidth is extremely lowered, a packet having a lower priority order cannot be transmitted. Also, when such packet is transmitted, a throughput of a packet P1 having a higher priority order is lowered.

Incidentally, a packet P2 having a lower priority order is not compressed by ROHC or the like, and thus is often large in size. In the case of a data packet such as FTP or HTTP, the bandwidth which is temporarily used tends to be large although its frequency is low.

Furthermore, in the shared channel mode, it is difficult that detailed QoS control based on the physical layer is performed for each service instance.
(3.2) Occupied Channel Mode (Second Packet Transmission Mode)

In the occupied channel mode, the radio communication terminal 100 and the radio base station 200 set a radio communication channel CH2 dedicated for an auxiliary service instance ASI. Then, the radio communication terminal 100 and the radio base station 200 set an auxiliary service instance ASI on the radio communication channel CH2 dedicated for the auxiliary service instance ASI.

With the occupied channel mode, it is obvious that an overhead of the packets P1 transmitted through the auxiliary service instance ASI are common. Accordingly, the overhead due to the service instance flow ID for identifying the auxiliary service instance ASI can be omitted.

Furthermore, another radio communication channel CH1 can be also assigned to the main service instance MSI. Accordingly, the packet P2 having a lower priority order can be transmitted by using the main service instance MSI.

On the other hand, in the occupied channel mode, it is difficult to use a bandwidth to be available capacities of the radio communication channels CH1 and CH2. That is, the advantage of omitting the overhead is obtained instead of occupying the radio communication channel CH2 by the auxiliary service instance ASI. Accordingly, the surplus bandwidth of the radio communication channels CH1 and CH2 is sacrificed.
(3.3) Switching Processing of the Shared Channel Mode and the Occupied Channel Mode The radio communication terminal 100 switches between the shared channel mode and the occupied channel mode depending on a radio quality between the radio communication terminal 100 and the radio base station 200. Specifically, the radio communication terminal 100 compares the radio quality with a threshold value, and selects either one of the shared channel mode or the occupied channel mode depending on the comparison result. A specified example of determination criteria of the communication quality will be described later.

The radio communication terminal 100 selects the shared channel mode if the radio quality is improved, whereas it selects the occupied channel mode if the radio quality is deteriorated.

If the radio quality is good and there is sufficient surplus bandwidth in one radio communication channel CH to which multiple service instances are assigned, the radio communication terminal 100 selects the shared channel mode. In the shared channel mode, a surplus throughput can be used for applications whose priority order becomes lower.

In contrast, if the radio quality is poor and it is difficult to secure the bandwidth, the radio communication terminal 100 selects the occupied channel mode. In the occupied channel mode, the overhead is set minimum, so that the bandwidth which can be used by the auxiliary service instance ASI can be secured as much as possible.

In the shared channel mode, a portion in the bandwidth in which QoS is shared is caused. However, since there is a sufficient bandwidth, a sufficient packet transmission quality can be secured even if the detailed QoS control is not given.

In contrast, in the occupied channel mode, the radio communication channel CH2 is occupied by the auxiliary service instance ASI having a higher priority order in terms of the QoS control need. Accordingly, the detailed QoS closely based on the physical layer and L2 (equivalent to the second layer of OSI reference model) can be individually performed. Thus, the narrow bandwidth can be carefully dealt, and the transmission quality can be sufficiently secured.

However, the resources are limited. In the occupied channel mode, the radio communication channel CH2 cannot always be assigned to the radio communication terminal 100.

In contrast, in the shared channel mode, the resource limitation can be largely eased since the channel is logically divided. For this reason, it is highly likely that the radio communication channel CH can be assigned according to the request from the radio communication terminal 100.

Accordingly, when the shared channel mode is selected at the time of starting communications, it can be avoided that VoIP session cannot be established because a resource cannot be assigned.

(4) Packet Configuration in Each Service Instance

Next, a packet configuration in each service instance will be described by referring to FIGS. 9 to 11.

(4.1) Packet Configuration in the Main Service Instance

FIG. 9 is a table showing a size of a payload and a header in the main service instance MSI.

In FIG. 9, the PPP header means a header defined by RFC1662: PPP in HDLC-like Framing.

As described above, the service instance flow ID is an identifier for indicating a service instance and is determined by a negotiation between the radio base station 200 and the radio communication terminal 100 when each service instance is established.

It is to be noted that an L3 delimiter is a delimiter tag for cutting out the L3 packet from an octet string transferred with an octet stream in a layer upper than the physical layer and the L2 layer, and displays a position of the next delimiter tag.

With a function of automatic repeat control (ARC) in the L2, the octet stream from the physical layer is sorted in the order intended by the transmission side, and delivered to the upper layer.

However, since the octet stream is delivered as an octet stream, a mechanism for cutting out the L3 packet is required. The L3 delimiter is an overhead for clearly showing a delimiter of the L3 packet by designating a position to the next delimiter. The reception side can cut out the L3 packet based on the delimiter.

(4.2) Packet Configuration in the Auxiliary Service Instance (when Shared Channel Mode is Used)

FIG. 10 is a table showing a size of a payload and a header in the auxiliary service instance ASI (when the shared channel mode is used).

In FIG. 10, the meaning of each overhead is similar to that in the case of the main service instance. However, since the service option 67 (SO67) is selected as the auxiliary service instance ASI, the overhead of the PPP header is omitted. Instead, the protocol distributed in the upper layer is limited to ROHC.

Incidentally, in the auxiliary service instance ASI, context information such as a protocol field is implicitly transmitted by a negotiation between the PDSN 300 and the radio communication terminal 100 according to the RSVP protocol.

In addition, a filed having a fixed value supplements a fixed value on the reception side as implicit transmission. A FCS field is also implicitly transmitted, and after calculating a data length based on the L3 delimiter, the reception side supplements the FCS field by performing recalculation.

(4.3) Packet Configuration in the Auxiliary Service Instance (when Occupied Channel Mode is Used)

FIG. 11 is a table showing a size of a payload and a header in the auxiliary service instance ASI (when the occupied channel mode is used).

In FIG. 11, a meaning of each overhead is same as that in the case of the main service instance. Since the channel is occupied, the service instance flow ID is obvious and is thus omitted.

(5) Packet Flow Control Processing

Next, the packet flow control processing executed in the radio communication terminal 100 and the radio base station 200 will be described.

In a case where an UDP protocol is used in a VoIP application, data is not retransmitted in the upper layer. A CODEC payload which missed a reproduction opportunity due to delay is abandoned by the application.

Accordingly, in the VoIP application, there is a case where a subjective voice quality can be more effectively maintained when improving a possibility that the following data would arrive in real time by positively abandoning the unallowably delayed packet, rather than causing delay of the following data arrival for securing the reliability of the data transmission of the delayed data.

Thus, when the retransmission of the unallowably delayed packet is controlled, a transmission path suitable for the VoIP application can be provided.

Also, the data transmitted from the radio communication terminal 100 to the radio base station 200 and the data transmitted from the radio base station 200 to the radio communication terminal 100 may be delayed due to the deterioration of the radio quality.

In such case, the transmission data is stored in the transmission buffer on the transmission side and waits until the radio quality is improved so that transmission can be performed. However, there may be a case where the radio quality is not improved. In such case, the transmission buffer is flooded due to the arrival of the following data. Thus, the older data have to be abandoned.

The packet which is transmitted through the auxiliary service instance ASI is RTP/UDP/IP having G729A voice data as a RTP payload. Accordingly, a subjective voice quality is better when it is secured that the data arrives in real time even at the expense of abandoning the packet, rather than increasing the reliability of data arrival by retransmission.

Accordingly, the radio communication terminal 100 and the radio base station 200 controls the auxiliary service instance ASI so as to downsize the transmission buffer and positively abandon the packets having arrived in about past three seconds or before.

In contrast, the radio communication terminal 100 and the radio base station 200 prepare a relatively large transmission buffer for the main service instance MSI in consideration of distribution of important data for maintaining the SIP telephone. With this, it can be controlled that abandonment of the packet is not caused as much as possible.

By the difference between the transmission buffer sizes of the main service instance MSI and the auxiliary service instance ASI, QoS to increase the reliability of data arrivability by avoiding packet deletion is given to the main service instance MSI, and QoS to increase accuracy of real-time data arrivability is given to the auxiliary service instance ASI.

(5.1) Packet Flow Control Processing in the Shared Channel Mode

FIGS. 12A and 12B are diagrams for illustrating packet flow control processing in the shared channel mode. Individual functional blocks shown in FIGS. 12A and 12B correspond to the transmission flow controller, the reception flow controller, and the buffer shown in FIGS. 5 to 7.

As shown in FIG. 12A, packets flowing through all the service instances at the time of transmission are once stored in transmission data queues 801A and 801B which are separately prepared for the respective service instances. The corresponding service instance flow ID is then added thereto. Furthermore, in the case of the auxiliary service instance ASI, a PPP header is removed.

After that, a flow controller 802 forwards a packet to an L3 data queue 804 according to a priority order along with a flow rate of the packet. If a sufficient bandwidth is present, all the packets are forwarded to the L3 data queue 804.

If the bandwidth is narrow, a bandwidth controller 803 preferentially forwards the packets for the auxiliary service instance ASI to the L3 data queue 804. If the bandwidth is further narrowed, the bandwidth controller 803 performs control of sequentially abandoning the oldest packet among the packets stored in the data queue 801B of the auxiliary service instance ASI.

As shown in FIG. 12B, an L4 flow separator 806 divides the packets from L3 into the respective service instances by using the service instance flow ID as a marker. With regard to the auxiliary service instance ASI, the flow controller 802 reconstructs an upper data packet by reconstructing a PPP header based on the context information for each auxiliary service instance ASI.

(5.2) Packet Flow Control Processing in the Occupied Channel Mode

Figure 13A:
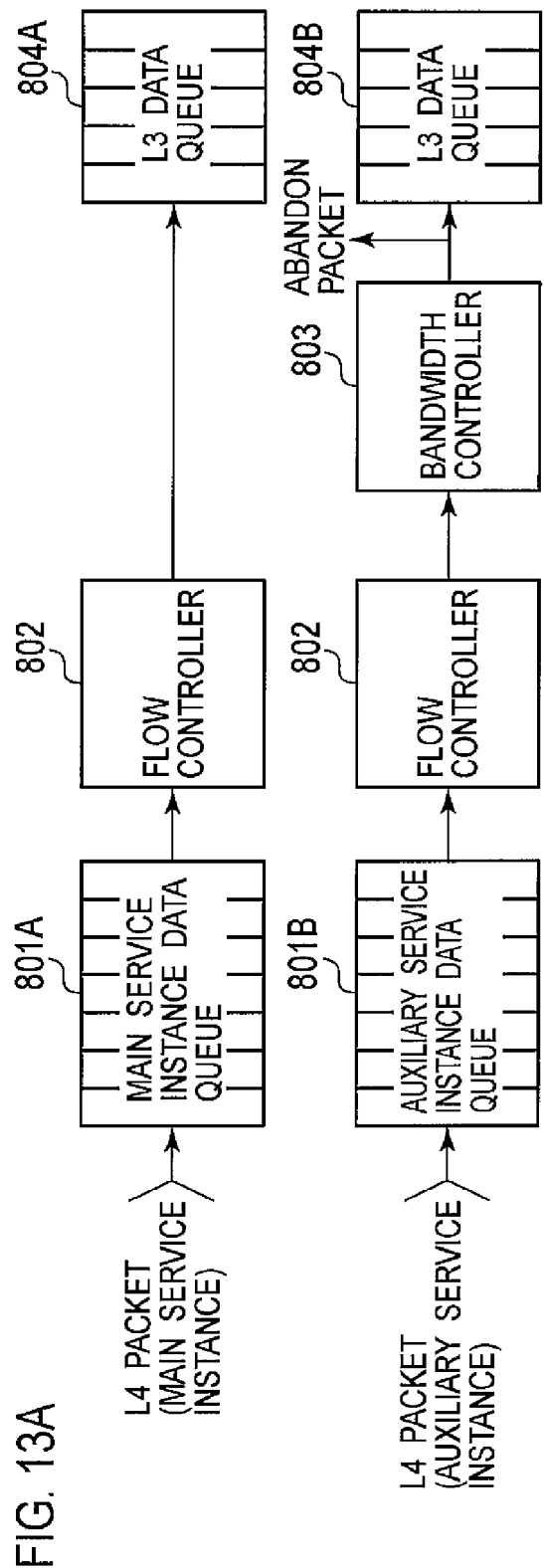
FIGS. 13A and 13B are diagrams for illustrating packet flow control processing in the occupied channel mode according to the embodiment of the present invention.
Figure 13B:
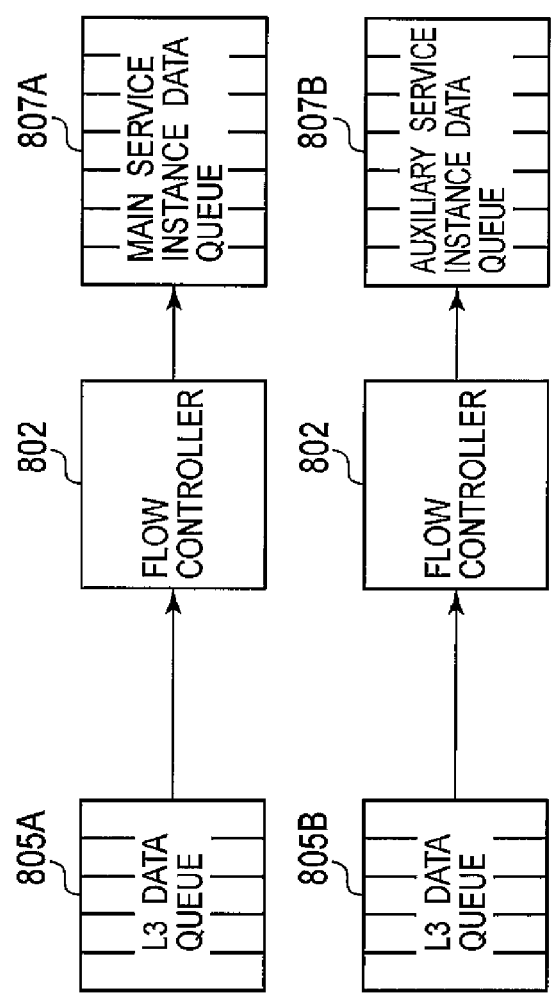

FIGS. 13A and 13B are diagrams for illustrating packet flow control processing in the occupied channel mode. The individual functional blocks shown in FIGS. 13A and 13B correspond to the transmission flow controller, the reception flow controller, and the buffer shown in FIGS. 5 to 7.

As shown in FIG. 13A, the bandwidth controller 803 abandons only the packet flowing through the auxiliary service instance ASI. Other points are similar to those of FIG. 12A.

As shown in FIG. 13B, with regard to the auxiliary service instance ASI, identification information of the radio communication channel (specifically, a time slot number) and related information of the auxiliary service instance ASI with the flow ID are used to sort the packets. Other points are same as those of FIG. 12A.

(6) Communication Frame Configuration and Adaptive Modulation

Next, a communication frame configuration and adaptive modulation will be described by referring to FIGS. 14 and 15.

(6.1) Configuration of the Communication Frame

Figure 14:
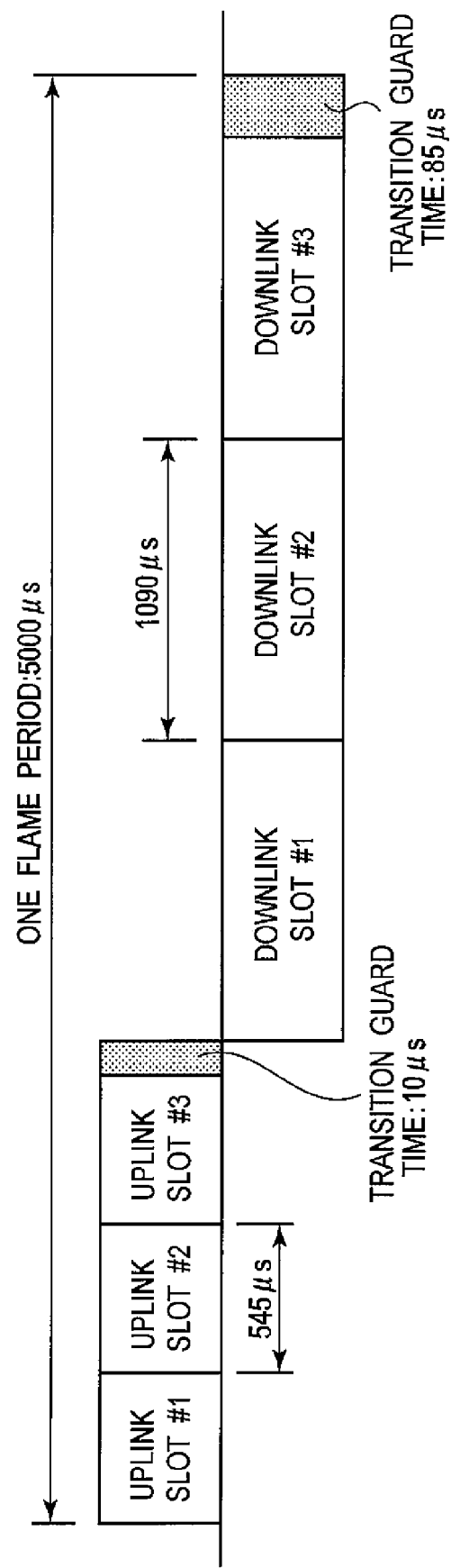
FIG. 14 is a flame configuration diagram of a communication frame used for a radio communication between the radio communication terminal and the radio base station according to the embodiment of the present invention.

FIG. 14 is a frame configuration diagram of a communication frame used for a radio communication between the radio communication terminal 100 and the radio base station 200.

In response to a radio connection request from the radio communication terminal 100, the radio base station 200 establishes a radio communication channel CH that uses one time slot (physical channel) according to TDMA-TDD.

FIG. 14 shows that both uplink (direction from the radio communication terminal 100 to the radio base station 200) and downlink (direction from the radio base station 200 to the radio communication terminal 100) are triplexed.

Timeslots have asymmetric configurations in the uplink and downlink. The uplink slot and downlink slot with the time slot number 1 form a pair, and are assigned to one radio communication terminal 100.

It is to be noted that the main service instance MSI is established on the timeslot having the slot number 1, and is assigned of 1 as the service instance flow ID.

(6.2) Adaptive Modulation

FIG. 15 is a table showing modulation classes of adaptive modulation executed in the radio communication terminal 100 and the radio base station 200.

The radio communication terminal 100 and the radio base station 200 support the modulation classes expressed as pairs of multiple modulation schemes and coding rates. Throughputs in FIG. 15 each show a throughput per physical channel.

In the modulation class, a required SINR is defined. As the modulation class has a higher required SINR, the throughput becomes larger. As the modulation class has a lower required SINR, the throughput becomes smaller.

If the received SINR is higher than the required SINR, the radio communication terminal 100 and the radio base station 200 select the highest modulation class possible so as to secure a high throughput.

If the received SINR is low, the radio communication terminal 100 and the radio base station 200 select a lower modulation class to perform control so that communication can be continued.

If the auxiliary service instance ASI is in the occupied channel mode, the radio communication terminal 100 monitors the modulation class used for transmission and reception. If either one of the modulation classes for transmission or reception is less than 3, the radio communication terminal 100 determines that the available capacity of the physical channel for transmission is not sufficient. Then, the occupied channel mode is continuously used.

If both of the modulation classes are equal to or larger than 3, the radio communication terminal 100 determines that the available capacity of the physical channel for transmission is sufficient. Then, the occupied channel mode is changed to the shared channel mode.

As a result, under the situation where the selected modulation class has a high throughput, a bandwidth is assigned to the auxiliary service instance ASI by using the shared channel mode, so that preferable VoIP can be performed. In contrast, under the situation where the low throughput is dominantly selected, the occupied channel mode is used to minimize the overhead.

(7) Detailed Operation of the Communication System

Next, a detailed operation of the communication system 10 will be described by referring to FIGS. 16 and 18.

(7.1) Operation of Setting a Service Instance

Figure 16:
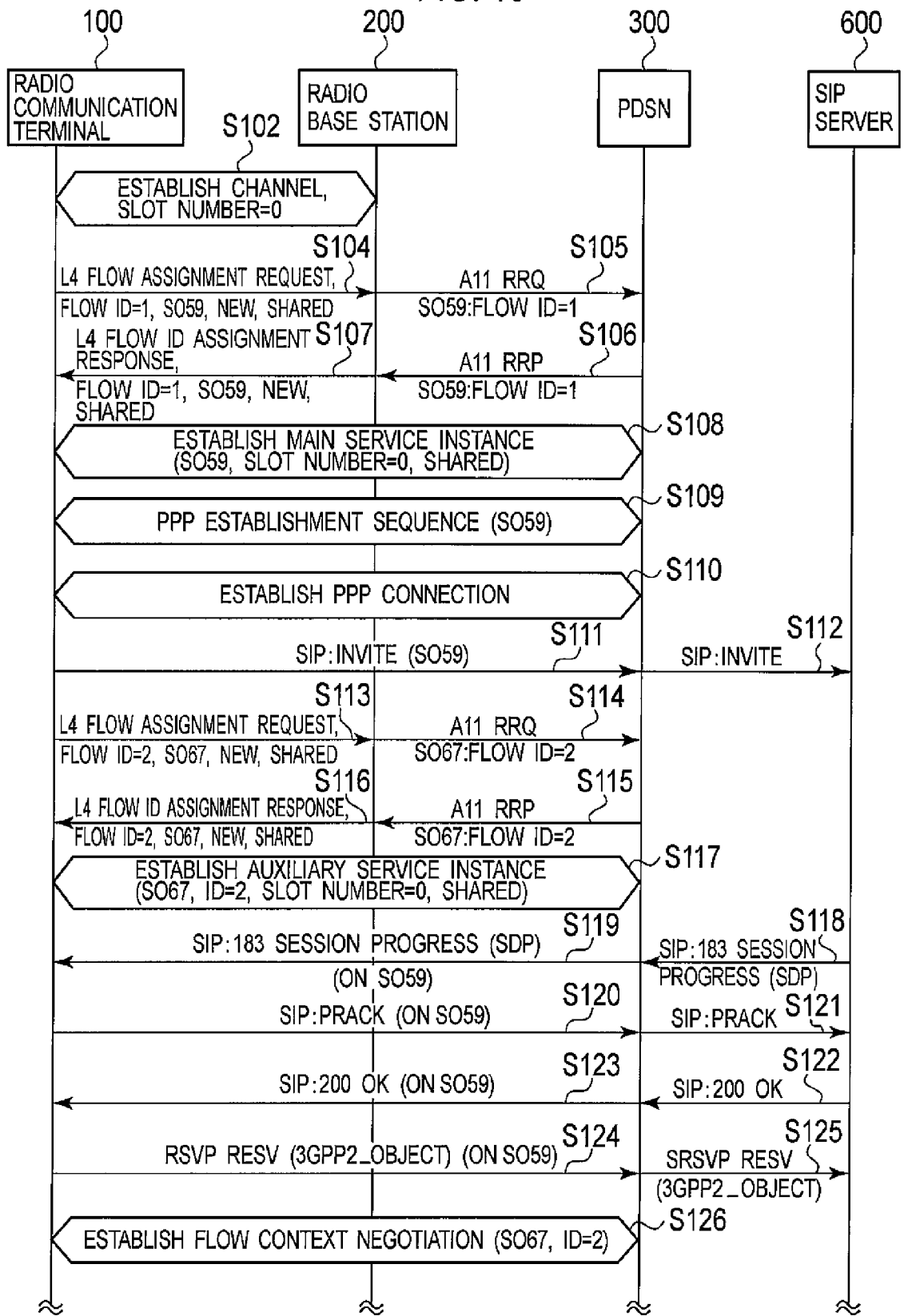
FIG. 16 is a sequence diagram showing a set-up operation of a service instance in the communication system according to the embodiment of the present invention.

FIG. 16 is a sequence diagram showing the operation of setting a service instance in the communication system 10.

In step S102, the radio communication terminal 100 and the radio base station 200 establish a radio communication channel CH by using a timeslot with the slot number 0.

In step S104, the radio communication terminal 100 transmits a main service instance MSI assignment request message to the radio base station 200. At this time, the radio communication terminal 100 designates a flow profile. Since the designated profile is the main service instance MSI, a flow ID is set to 1, and a service option is set to S059, and then "new" and "shared" are designated as additive attributes.

In step S105, the radio base station 200 requests the PDSN 300 to establish the main service instance MSI by using an A11 signaling protocol, according to the content of the profile requested from the radio communication terminal 100.

In step S106, the PDSN 300 transmits a response message to the radio base station 200 in response to the request in step S105.

In step S107, the radio base station 200 transmits a main service instance MSI assignment response message to the radio communication terminal 100.

In step S108, the main service instance MSI is established among the radio communication terminal 100, the radio base station 200, and the PDSN 300.

In step S109, between the radio communication terminal 100 and the PDSN 300, the radio communication terminal 100 executes an establishment sequence of the PPP connection. In the establishment sequence of the PPP connection, the PDSN 300 assigns a global IP address to the radio communication terminal 100.

In step S110, the PPP connection is established among the radio communication terminal 100, the radio base station 200, and the PDSN 300.

Through steps S111 to S117, the radio communication terminal 100 recognizes that a user uses an SIP telephone, and performs the following operations by using the main service instance MSI.

Exchange a message for SIP call, between the radio communication terminal 100 and the SIP service 600

Exchange the context of the auxiliary service instance ASI according to RSVP, between the radio communication terminal 100 and the PDSN 300.

Exchange a message for establishing the auxiliary service instance ASI between the radio communication terminal 100 and the radio base station 200

Since the auxiliary service instance ASI between the radio communication terminal 100 and the radio base station 200 is not established at this moment, it is established by the shared channel mode. Specifically, the auxiliary service instance ASI is assigned by sharing the physical channel with the slot number 1. At this time, the radio communication terminal 100 designates a flow profile.

In step S113, since the radio communication terminal 100 has the designated profile which is the auxiliary service instance ASI, the flow ID is set to a unique number equal to or larger than 2, the service option is set to SO67, and "new" and "shared" are designated as additive attributes.

In step S114, according to the content of the profile requested from the radio communication terminal 100, the radio base station 200 requests the PDSN 300 to establish the auxiliary service instance ASI by using the A11 signaling protocol. In steps S115 and S116, a response message is transmitted to the radio communication terminal 100.

In step S117, the auxiliary service instance ASI is established among the radio communication terminal 100, the radio base station 200, and the PDSN 300. After that, the radio communication terminal 100 exchanges a packet context according to RSVP, with the PDSN 300.

By the above-described sequence, the main service instance MSI and the auxiliary service instance ASI are established among the radio communication terminal 100, the radio base station 200, and the PDSN 300. The service instance flow ID, the slot number, and the context of the service instance are associated, and stored in each of the radio base station 200 and the radio communication terminal 100.

Note that the auxiliary service instance ASI between the radio communication terminal 100 and the radio base station 200 is realized by the shared channel mode.

In addition, after the auxiliary service instance ASI is established, through steps S118 to S125, the radio communication terminal 100 and the SIP server 600 transmit and receive an SIP message through the radio base station 200 and the PDSN 300. The radio communication terminal 100 exchanges the packet context with the PDSN 300 according to RSVP. Then, in step S126, a flow context negotiation is established.

(7.2) Operation of Switching from the Shared Channel Mode to the Occupied Channel Mode FIG. 17 is a sequence diagram showing an operation of switching from the shared channel mode to the occupied channel mode.

Here, the auxiliary service instance ASI in the shared channel mode is established so as to be shared with the main service instance on the physical channel with the slot number 1. In addition, a unique number equal to or larger than 2 is assigned to the service instance flow ID.

In step S201, the radio communication terminal 100 establishes the physical channel having the slot number 2 between the radio communication terminal 100 and the radio base station 200.

In step S202, the radio communication terminal 100 transmits an auxiliary service instance assignment request message to the radio base station 200. The service instance flow ID and the service option number in the profile designated at this time are the same values as those which have been already assigned to the auxiliary service instance ASI. The radio communication terminal 100 designates the time slot number as 2 and designates "switch" and "occupied" as additive attributes.

In step S203, the radio base station 200 transmits a flow assignment response message to the radio communication terminal 100.

In step S204, the auxiliary service instance ASI is switched among the radio communication terminal 100, the radio base station 200, and the PDSN 300. Specifically, the auxiliary service instance ASI is cut out from the physical channel (a radio communication channel) having the time slot number 1 to the physical channel (a radio communication channel) having the time slot number 2.

In steps S205 and S206, a packet is transmitted by using the auxiliary service instance ASI after the switching.

With the above-described sequence, the switching from the shared channel mode to the occupied channel mode is realized.

(7.3) Operation of Switching from the Occupied Channel Mode to the Shared Channel Mode FIG. 18 is a sequence diagram showing an operation of switching from the occupied channel mode to the shared channel mode.

Here, the auxiliary service instance ASI in the occupied channel mode is established with a slot number other than 1, and a unique number equal to or larger than 2 is assigned to the service instance flow ID.

In step S301, the radio communication terminal 100 transmits an auxiliary service instance assignment request message to the radio base station 200. At this time, in the profile, 1 is designated as the time slot number, and "switch" and "occupied" are designated as additive attributes.

In step S302, the radio base station 200 transmits an auxiliary service instance ASI assignment response message to the radio communication terminal 100.

After that, the switching of the auxiliary service instance ASI is completed (step S303).

In step 304, after the switching of the auxiliary service instance ASI is completed, the radio communication terminal 100 and the radio base station 200 disconnect the physical channel having the slot number 2 which will be no longer necessary. In steps S305 and S306, a packet is then transmitted by using the auxiliary service instance ASI after the switching. It is to be noted that the PDSN 300 is not particularly involved with this sequence.

(8) Advantageous Effects

According to the present embodiment, the radio communication terminal 100 which transmits and receives multiple types of packets including a RTP packet between the radio communication terminal 100 and the PDSN 300 via the radio base station 200. This radio communication terminal 100 sets an auxiliary service instance ASI which is a logical communication path used for transmitting the RTP packet and a main service instance MSI which is a logical communication path used for transmitting a different type of packet from the RTP packet, between the radio communication terminal 100 and the PDSN 300.

The radio communication terminal 100 acquires information identifying a modulation class corresponding to a radio quality between the radio communication terminal 100 and the radio base station 200, the information serving as communication quality information.

Then, the radio communication terminal 100 selects either one of the shared channel mode or the occupied channel mode. Here, in the shared channel mode, the service instance flow ID to indicate that the packet transmission is made by using the auxiliary service instance ASI, is added to the RTP packet, and in the occupied channel mode, the addition of the service instance flow ID to the RTP packet is omitted.

If the shared channel mode is selected, the radio communication terminal 100 adds the service instance flow ID to the RTP packet. In contrast, if the occupied channel mode is selected, the radio communication terminal 100 omits the addition of the service instance flow ID to the RTP packet.

Accordingly, in a case where multiple service instances are set, the radio communication terminal 100 capable of selecting a packet transmission mode depending on the radio communication quality can be provided.

According to the present embodiment, based on the radio communication quality information, the radio communication terminal 100 determines whether or not the radio communication quality is improved. If it is determined that the radio communication quality is improved, the shared channel mode is selected. In the shared channel mode, the radio communication terminal 100 sets an auxiliary service instance ASI and a main service instance MSI on the same radio communication channel CH.

In addition, based on the radio quality information, the radio communication terminal 100 determines whether the radio communication quality is deteriorated. If it is determined that the radio communication is deteriorated, the occupied channel mode is selected. In the occupied channel mode, the radio communication terminal 100 sets an auxiliary service instance ASI on a radio communication channel CH dedicated for the auxiliary service instance ASI.

Accordingly, effective utilization of the available capacity when the radio quality is good, the reduction of an overhead when the radio quality is poor, and the detailed QoS control based on the physical layer can be realized in a balanced manner.

(9) Other Embodiments

The present invention has been described by the preferred embodiment. However, it should be understood that the description and drawings which constitute a part of this disclosure does not limit the invention. From this disclosure, various alternative embodiments, examples, operational techniques will be apparent to a person skilled in the art.

(9.1) Modified Example of Communication Quality Information

In the above-described embodiment, as a reference for switching between the occupied channel mode and the shared channel mode, the approach of comparing the selected modulation class to a threshold value to be a reference for switching is used.

However, as a more detailed control method, it is also effective to provide a means for measuring a throughput of data transmitting the L2 and a table for storing the threshold value to be compared with this throughput, and to perform switching based on the comparison of these elements. A situation where not only a using modulation class but also FER are high occurs frequently in the actual operation. In such case, a better result can be obtained by including the actual obtained amount of throughput in the determination criteria.

(9.2) Modified Example of an Auxiliary Service Instance

FIG. 19 is a diagram showing a modified example of an auxiliary service instance. As shown in FIG. 19, the auxiliary service instance ASI may be multiple.

In the case of an application like a television telephone, voice packet flow and image packet flow must be controlled under largely-different conditions in terms of influence of packet loss, data size, and the like, and normally require different QoS.

For this reason, a television telephone can be provided with a better quality as a whole if individual service instances are used to perform different QoS.

In the case of such QoS request, as shown in FIG. 19, assigning individual auxiliary service instances $ASI_1$ and $ASI_2$ respectively to the voice packet flow P1 and the image packet flow P3, may be one conceivable method. For example, just after a television telephone session is started, the main service instance MSI and the auxiliary service instances $ASI_1$ and $ASI_2$ are established in the shared channel mode.

If a deterioration of an electric wave condition lowers a modulation class and thus makes it difficult to secure a throughput, the auxiliary service instance $ASI_1$ transferring the voice packet flow P1 is firstly switched to the occupied channel mode. In this way, an interruption in a voice message is prevented.

In the case of missing image data, the moving image only stops by the television telephone application processing. In contrast, missing voice data leads to a noise which normally causes unpleasantness. For this reason, the control of securing the voice data first is effective.

Also, the auxiliary service instance $ASI_2$ which transfers the image packet flow may be, of course, controlled so as to be switched to the occupied channel mode, if needed. When the electric wave condition is improved, the modulation class is increased and throughput becomes sufficient, a bandwidth to be an available capacity which cannot be used in the occupied channel mode becomes usable for other usages if the mode is returned to the shared channel mode again.

(9.3) Modified Example of a Radio Communication Channel CH

In the above-described embodiment, the description is given by using the example in which the physical channel itself functions as the radio communication channel CH which transfers the service instance.

Recently, a channel aggregate technique in which multiple physical channels are aggregated into one radio communication channel CH has been realized.

If the channel aggregate technique is used, a method in which physical channels having slot numbers 1 to 3 are firstly aggregated and multiple service instances are established therein as one radio communication channel CH by the shared channel mode, is also effective.

If the radio quality is deteriorated, the physical channel having the slot number 3 is detached from the radio communication channel CH, and the radio communication channel CH is reestablished as an independent radio communication channel CH. Then, the auxiliary service instance ASI is established in this channel by the occupied channel mode.

In this way, it is possible to provide a channel capable of securing a channel having a wider bandwidth when the radio wave in a good condition, and guaranteeing the minimum throughput of the auxiliary session when the radio wave condition is deteriorated.

(9.4) Modified Examples of a Radio Communication Terminal and a Radio Base Station In the above-described embodiment, various kinds of processes that the radio communication terminal 100 executes may be executed by the radio base station 200 if appropriate. In this case, the mode selector 264 shown in FIG. 6 selects either one of the occupied channel mode or the shared channel mode depending on the radio quality information acquired by the radio quality information acquiring unit 263.

As has been described, it should be understood that the present invention includes various embodiments which are not described herein. Accordingly, the present invention is only limited by the particular matters contained in the scope of claims which are appropriate from this disclosure.

What is claimed is:

1. A radio communication terminal which transmits and receives a plurality of types of packets including a particular type of packet to and from a communication destination device through a radio base station, the radio communication terminal comprising:

a communication session setting unit configured to set a first communication session and a second communication session between the radio communication terminal and the communication destination device, the first communication session being a logical communication path used for transmitting the particular type of packet, the second communication session being a logical communication path used for transmitting a type of packet different from the particular type of packet;

a radio quality information acquiring unit configured to acquire radio quality information showing a radio quality between the radio communication terminal and the radio base station;

a packet transmission mode selector configured to select any one of a first packet transmission mode and a second packet transmission mode on the basis of the radio quality information acquired by the radio quality information acquiring unit, the first packet transmission mode including an addition of a session identifier to the particular type of packet, the session identifier indicating that the particular type of packet is transmitted by using the first communication session, the second packet transmission mode omitting the addition of the session identifier to the particular type of packet; and a session identifier adding unit configured to add the session identifier to the particular type of packet if the first packet transmission mode is selected by the packet transmission mode selector, wherein the session identifier adding unit omits the addition of the session identifier to the particular type of packet if the second packet transmission mode is selected by the packet transmission mode selector.

2. The radio communication terminal according to claim 1, wherein based on the radio quality information, the packet transmission mode selector determines whether or not the radio quality is improved, and the packet transmission mode selector selects the first packet transmission mode when it is determined that the radio quality is improved.

3. The radio communication terminal according to claim 1, wherein based on the radio quality information, the packet transmission mode selector determines whether or not the radio quality is deteriorated, and the packet transmission mode selector selects the second packet transmission mode when it is determined that the radio quality is deteriorated.

4. The radio communication terminal according to claim 1, further comprising:

a radio communication channel setting unit configured to set radio communication channels between the radio communication terminal and the radio base station, the radio communication channels each being formed of at least one physical channel defined by a physical resource, wherein the communication session setting unit sets the first and second communication sessions on one of the radio communication channels if the first packet transmission mode is selected by the packet transmission mode selector.

5. The radio communication terminal according to claim 4, wherein the radio communication channel setting unit sets one of the radio communication channels to be dedicated for the first communication session, if the second packet transmission mode is selected by the packet transmission mode selector, and the communication session setting unit sets the first communication session on the radio communication channel dedicated for the first communication session, if the second packet transmission mode is selected by the packet transmission mode selector.

6. The radio communication terminal according to claim 1, wherein the particular type of packet is a packet which needs to be transmitted with a transmission delay shorter than that for the type of packet different from the particular type of packet.

7. A radio base station which transmits and receives a plurality of types of packets including a particular type of packet to and from a radio communication terminal, the radio base station comprising:

a communication session setting unit configured to set a first communication session and a second communication session between the radio communication terminal and a communication destination device of the radio communication, the first communication session being a logical communication path used for transmitting the particular type of packet, the second communication session being a logical communication path used for transmitting a type of packet different from the particular type of packet;

a radio quality information acquiring unit configured to acquire radio quality information showing a radio quality between the radio base station and the radio communication terminal;

a packet transmission mode selector configured to select any one of a first packet transmission mode and a second packet transmission mode on the basis of the radio quality information acquired by the radio quality information acquiring unit, the first packet transmission mode including an addition of a session identifier to the particular type of packet, the session identifier indicating that the particular type of packet is transmitted by using the first communication session, the second packet transmission mode omitting the addition of the session identifier to the particular type of packet; and a session identifier adding unit configured to add the session identifier to the particular type of packet if the first packet transmission mode is selected by the packet transmission mode selector, wherein the session identifier adding unit omits the addition of the session identifier to the particular type of packet if the second packet transmission mode is selected by the packet transmission mode selector.

8. A packet communication method for transmitting and receiving a plurality of types of packets including a particular type of packet through a radio base station between a radio communication terminal and a communication destination device with which the radio communication terminal communicates, the packet communication method comprising the steps of:

setting a first communication session and a second communication session between the radio communication terminal and the communication destination device, the first communication session being a logical communication path used for transmitting the particular type of packet, the second communication session being a logical communication path used for transmitting a type of packet different from the particular type of packet;

acquiring radio quality information showing a radio quality between the radio communication terminal and the radio base station;

selecting any one of a first packet transmission mode and a second packet transmission mode on the basis of the radio quality information acquired in the acquiring step, the first packet transmission mode including an addition of a session identifier to the particular type of packet, the session identifier indicating that the particular type of packet is transmitted by using the second communication session, the second packet transmission mode omitting the addition of the session identifier to the particular type of packet;

adding the session identifier to the particular type of packet if the first packet transmission mode is selected in the selecting step; and omitting the addition of the session identifier to the particular type of packet if the second packet transmission mode is selected in the selecting step.

* * * * *